(12) United States Patent
Morad et al.

(10) Patent No.: US 11,367,050 B2
(45) Date of Patent: Jun. 21, 2022

(54) DIGITAL PROCESSING SYSTEMS AND METHODS FOR CUSTOMIZED CHART GENERATION BASED ON TABLE DATA SELECTION IN COLLABORATIVE WORK SYSTEMS

(71) Applicant: MONDAY.COM LTD., Tel Aviv (IL)

(72) Inventors: Oron Morad, Or Yehuda (IL); Shirley Baumer, Tel Aviv (IL); Ofir Monsingo, Tel Aviv (IL); Daniel Lereya, Tel Aviv (IL)

(73) Assignee: MONDAY.COM, LTD., Tel Aviv (IL)

( * ) Notice: Subject to any disclaimer, the term of this patent is extended or adjusted under 35 U.S.C. 154(b) by 0 days.

(21) Appl. No.: 17/243,969

(22) Filed: Apr. 29, 2021

(65) Prior Publication Data

US 2021/0350594 A1  Nov. 11, 2021

Related U.S. Application Data

(63) Continuation of application No. PCT/IB2021/000297, filed on Apr. 28, 2021, which is
(Continued)

(51) Int. Cl.
*G06F 17/00* (2019.01)
*G06Q 10/10* (2012.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
CPC . G06T 11/206; G06T 2200/24; G06F 40/103; G06F 3/04845; G06Q 10/103
See application file for complete search history.

(56) References Cited

U.S. PATENT DOCUMENTS 5,479,602 A   12/1995   Baecker et al.
5,696,702 A   12/1997   Skinner et al.
(Continued)

FOREIGN PATENT DOCUMENTS

CN   107422666 A   12/2017
CN   107623596 A   1/2018
(Continued)

OTHER PUBLICATIONS

D'Alessio et al., Monday.com Walkthrough 2018\All Features, Platforms & Thoughts, (https://www.youtube.com/watch?v=ajBtOzTlhC8&t=352s), Mar. 1, 2018, Screenshots and transcript pp. 1-55, (Year: 2018).

(Continued)

*Primary Examiner* — Mohammed H Zuberi
(74) *Attorney, Agent, or Firm* — Finnegan, Henderson, Farabow, Garrett & Dunner, LLP

(57) ABSTRACT

Systems, methods, and computer-readable media for customizing chart generation based on table data selection are disclosed. The systems and methods may involve at least one processor that is configured to maintain at least one table containing rows, receive a first selection of at least one cell in the at least one table, generate a graphical representation associated with the first selection of at least one other cell, generate a first selection-dependent link between the at least one table and the graphical representation, receive a second selection of at least one cell in the at least one table, alter the graphical representation based on the second selection, and generate a second selection-dependent link between the at least one table and the graphical representation.

27 Claims, 36 Drawing Sheets

Related U.S. Application Data a continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | |
|---|---|
| *G06Q 10/06* | (2012.01) |
| *G06F 16/14* | (2019.01) |
| *G06F 16/23* | (2019.01) |
| *G06F 16/25* | (2019.01) |
| *G06F 16/11* | (2019.01) |
| *H04L 67/1095* | (2022.01) |
| *G06F 3/0482* | (2013.01) |
| *G06F 3/14* | (2006.01) |
| *H04L 51/046* | (2022.01) |
| *H04L 51/04* | (2022.01) |
| *G06F 40/279* | (2020.01) |
| *G06F 40/40* | (2020.01) |
| *G06F 40/30* | (2020.01) |
| *G06K 9/62* | (2022.01) |
| *G06F 3/04817* | (2022.01) |
| *G06F 3/16* | (2006.01) |
| *H04L 12/18* | (2006.01) |
| *G06F 16/22* | (2019.01) |
| *G06F 16/2455* | (2019.01) |
| *G06F 16/248* | (2019.01) |
| *G06F 40/177* | (2020.01) |
| *H04L 65/401* | (2022.01) |
| *G06N 20/00* | (2019.01) |
| *G06F 40/186* | (2020.01) |
| *G06F 3/0484* | (2022.01) |
| *G06F 11/30* | (2006.01) |
| *G06F 11/34* | (2006.01) |
| *G06F 40/103* | (2020.01) |
| *G06F 3/04845* | (2022.01) |
| *G06T 11/20* | (2006.01) |
| *G06F 16/909* | (2019.01) |
| *G06F 16/9038* | (2019.01) |
| *G06F 16/9032* | (2019.01) |
| *G06F 16/901* | (2019.01) |
| *G06F 16/951* | (2019.01) |
| *G06F 16/9536* | (2019.01) |
| *G06F 16/28* | (2019.01) |
| *G06F 16/26* | (2019.01) |
| *G06F 40/253* | (2020.01) |
| *H04L 51/18* | (2022.01) |
| *H04L 51/48* | (2022.01) |
| *G06F 16/903* | (2019.01) |
| *G05B 13/02* | (2006.01) |
| *G06F 16/31* | (2019.01) |
| *G06F 40/106* | (2020.01) |
| *G06F 9/54* | (2006.01) |
| *B65D 83/04* | (2006.01) |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/328* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/28* (2013.01); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(56) References Cited

U.S. PATENT DOCUMENTS

| | | |
|---|---|---|
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |
| 7,054,891 B2 | 5/2006 | Cole |

(56) References Cited

U.S. PATENT DOCUMENTS

| | | |
|---|---|---|
| 7,237,188 B1 | 6/2007 | Leung |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 * | 7/2016 | Gur .................. G06F 3/0482 |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,798,829 B1 | 10/2017 | Baisley |
| 9,866,561 B2 | 1/2018 | Psenka et al. |
| 9,870,136 B2 * | 1/2018 | Pourshahid .......... G06F 40/106 |
| 9,990,350 B2 * | 6/2018 | Campbell .............. G06F 40/18 |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,360 B2 * | 5/2019 | Krause ................ G06F 40/169 |
| 10,282,405 B1 | 5/2019 | Silk et al. |
| 10,282,406 B2 | 5/2019 | Bissantz |
| 10,311,080 B2 | 6/2019 | Folting et al. |
| 10,327,712 B2 * | 6/2019 | Beymer ................ G16H 50/20 |
| 10,347,017 B2 * | 7/2019 | Ruble .................. G06F 9/451 |
| 10,372,706 B2 | 8/2019 | Chavan et al. |
| 10,380,140 B2 | 8/2019 | Sherman |
| 10,423,758 B2 * | 9/2019 | Kido .................... G16H 15/00 |
| 10,445,422 B2 * | 10/2019 | Canton ................. G06F 40/18 |
| 10,445,702 B1 | 10/2019 | Hunt |
| 10,452,360 B1 | 10/2019 | Burman et al. |
| 10,474,317 B2 | 11/2019 | Ramanathan et al. |
| 10,474,746 B2 * | 11/2019 | Kalisz ................. G06F 16/283 |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,628,002 B1 | 4/2020 | Kang et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 * | 8/2020 | Dang ................. G06Q 10/063 |
| 10,748,312 B2 * | 8/2020 | Ruble .................... G06T 3/40 |
| 10,754,688 B2 | 8/2020 | Powell |
| 10,795,555 B2 * | 10/2020 | Burke .................. G06F 16/252 |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0039001 A1 | 2/2005 | Hudis et al. |
| 2005/0044486 A1 | 2/2005 | Kotler et al. |
| 2005/0086360 A1 | 4/2005 | Mamou et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0107196 A1 | 5/2006 | Thanu et al. |

(56) References Cited

U.S. PATENT DOCUMENTS

| | | |
|---|---|---|
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2007/0050322 A1 | 3/2007 | Vigesaa et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2010/0017699 A1 | 1/2010 | Farrell et al. |
| 2010/0070895 A1 | 3/2010 | Messer |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0089914 A1 | 4/2012 | Holt et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0103417 A1* | 4/2013 | Seto ............... G16H 40/20 705/2 |
| 2013/0104035 A1 | 4/2013 | Wagner et al. |
| 2013/0111320 A1 | 5/2013 | Campbell et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238363 A1* | 9/2013 | Ohta ............... G16H 30/20 705/3 |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |

(56) References Cited

U.S. PATENT DOCUMENTS

| | | |
|---|---|---|
| 2014/0006326 A1 | 1/2014 | Bazanov |
| 2014/0019842 A1 | 1/2014 | Montagna et al. |
| 2014/0043331 A1* | 2/2014 | Makinen .......... G06T 15/08 345/424 |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0109012 A1 | 4/2014 | Choudhary et al. |
| 2014/0115518 A1 | 4/2014 | Abdukalykov et al. |
| 2014/0136972 A1 | 5/2014 | Rodgers et al. |
| 2014/0137144 A1 | 5/2014 | Järvenpää et al. |
| 2014/0173401 A1 | 6/2014 | Oshlag et al. |
| 2014/0188748 A1 | 7/2014 | Cavoue et al. |
| 2014/0195933 A1 | 7/2014 | Rao Dv |
| 2014/0214404 A1 | 7/2014 | Kalla et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0125834 A1 | 5/2015 | Mendoza |
| 2015/0153943 A1 | 6/2015 | Wang |
| 2015/0169531 A1 | 6/2015 | Campbell et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1* | 12/2016 | Ritchie .......... G06F 40/177 |
| 2017/0031967 A1 | 2/2017 | Chavan et al. |
| 2017/0041296 A1 | 2/2017 | Ford et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0139884 A1 | 5/2017 | Bendig et al. |
| 2017/0153771 A1 | 6/2017 | Chu |
| 2017/0185668 A1 | 6/2017 | Convertino et al. |
| 2017/0221072 A1 | 8/2017 | AthuluruTlrumala et al. |
| 2017/0236081 A1 | 8/2017 | Grady Smith et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0351252 A1 | 12/2017 | Kleifges et al. |
| 2017/0372442 A1 | 12/2017 | Mejias |
| 2018/0032570 A1 | 2/2018 | Miller et al. |
| 2018/0055434 A1 | 3/2018 | Cheung et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0276417 A1 | 9/2018 | Cerezo |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373757 A1 | 12/2018 | Schukovets et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0151630 A1 | 5/2020 | Shakhnovich |
| 2020/0159558 A1 | 5/2020 | Bak |
| 2020/0247661 A1 | 8/2020 | Rao et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |

(56) References Cited

U.S. PATENT DOCUMENTS

| | | |
|---|---|---|
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |

FOREIGN PATENT DOCUMENTS

| | | |
|---|---|---|
| CN | 107885656 A | 4/2018 |
| WO | WO 2004/100015 A2 | 11/2004 |
| WO | WO 2006/116580 A2 | 11/2006 |
| WO | WO 2017202159 A1 | 11/2017 |

OTHER PUBLICATIONS

Rodrigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/1B2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/1B2020/000024, dated May 3, 2021 (13 pages).
"Pivot table—Wikipedia"; URL: https://en.wikepedia .org/w/index. php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2010, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,803, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.

* cited by examiner

| Task | Person | | Status | | Priority | Type | | SP | | Actual SP |
|---|---|---|---|---|---|---|---|---|---|---|
| Subscribing gue 1 | ⊙ | Person 1 | 55 | ○Done 139 | ○Low | ○Increment | 79 | 1 | 63 | blank |
| Add guest on su 1 | ⊙ | Person 2 | 50 | ○Dev ready 8 | ○High | ○Bug | 25 | .5 | 28 | 1 |
| Merge status on 1 | ⊙ | Person 3 | 21 | ○Moved to f... 5 | ○Q1 2020 | ○N/A | 24 | 0 | 28 | .5 |
| Remove 'share' 1 | ⊙ | Person 4 | 14 | ○Working on it 4 | ○Medium | ○blank | 17 | 2 | 22 | 0.5 |
| Leftpane suppo 1 | ⊙ | Person 5 | 13 | ○Need Break...4 | ○Best effort | ○Debt | 9 | 0.5 | 17 | 2 |
| Timeline view 1 | ⊙ | Person 6 | 5 | ○Waiting for... 3 | ●CRITICAL | ○Craftsmans..9 | | blank | 8 | 0 |
| Timeline call cl 1 | ⊙ | Person 7 | 4 | ○Stuck 3 | | ○Tests | 5 | 3 | 7 | 1.5 |

[Save to this widget]

400
401 — Person
403 — Status

FIG. 4

Filter 501

| Groups | Person | | Status | | Priority | Type | | SP | Actual SP |
|---|---|---|---|---|---|---|---|---|---|
| Top group 14 | | | ○Done | 55 139 | ○Low | ○Increment | 79 | 1 | blank |
| Iteration 97 14 | Subscribing gue 1 | | ○Dev ready | 50 8 | ○High | ○Bug | 25 | .5 63 | 1 |
| Iteration 95 | Add guest on su 1 | | ○Moved to f... | 21 5 | ○Q1 2020 | ○N/A | 24 | 0 28 | .5 |
| Iteration 98 | Merge status on 1 | | ○Working on it | 14 4 | ○Medium | ○blank | 17 | 2 28 | 0.5 |
| hackathon lefto.. | Remove 'share' 1 | | ○Need Break... | 13 4 | ○Best effort | ○Debt | 9 | 0.5 22 | 2 |
| Data structur.. | leftpane support 1 | | ○Waiting for... | 5 3 | ●CRITICAL | ○Craftsmans..9 | | blank 17 | 0 |
| Iteration 95 14 | Timeline view 1 | | ○Stuck | 4 3 | | ○Tests | 5 | 3 8 | 1.5 |
| | Timeline call cl 1 | | | | | | | 7 | |

Filter by text | Edit | 503

Save to this widget

FIG. 5

| Project 1 | Person | Task Details | Status | Priority | Timeline |
|---|---|---|---|---|---|
| Task 17 |  Person 1 | Timeline call | In Progress | CRITICAL | Jun 17 – Jul 4 |
| Task 68 |  Person 1 | Timeline review | Stuck | CRITICAL | Jun 1 – Jul 7 |
| Task 113 |  Person 2 | Remove "share" option | Done | CRITICAL | May 6 – Jul 5 |
FIG. 6

700

| Task | Person | | Status | | Priority | | Type | | SP | | Actual SP | |
|---|---|---|---|---|---|---|---|---|---|---|---|---|
| Subscribing gue 1 | Person 1 | 55 | ODone | 139 | OLow | | OIncrement | 79 | 1 | 63 | blank | |
| Add guest on su 1 | Person 2 | 50 | ODev ready | 8 | OHigh | | OBug | 25 | .5 | 28 | 1 | |
| Merge status on 1 | Person 3 | 21 | OMoved to f... | 5 | OQ1 2020 | | ON/A | 24 | 0 | 28 | .5 | |
| Remove 'share' 1 | Person 4 | 14 | OWorking on it | 4 | OMedium | | Oblank | 17 | 2 | 22 | 0.5 | |
| Leftpane suppo 1 | Person 5 | 13 | ONeed Break... | 4 | OBest effort | | ODebt | 9 | 0.5 | 17 | 2 | |
| Timeline view 1 | Person 6 | 5 | OWaiting for... | 3 | 1 Selected | | OCraftsmans... | 9 | blank | 8 | 0 | |
| Timeline call cl 1 | Person 7 | 4 | OStuck | 3 | ●CRITICAL 1/4 | | OTests | 5 | 3 | 7 | 1.5 | |

[ Save to this widget ]

| 800 | | | Filter by text | | | Edit | | | |
|---|---|---|---|---|---|---|---|---|---|
| Task | Person | | Status | | Priority | | Type | SP | Actual SP |
| Subscribing gue 1 | Person 2 | 50 | ODone | 139 | OLow | | OIncrement | 79 | 1 | 1 | 63 | blank |
| Add guest on su 1 | Person 3 | 21 | ODev ready | 8 | OHigh | | OBug | 25 | .5 | 28 | 1 |
| Merge status on 1 | Person 4 | 14 | OMoved to f... | 5 | OQ1 2020 | | ON/A | 24 | 0 | 28 | .5 |
| Remove 'share' 1 | Person 5 | 13 | OWorking on it | 4 | OMedium | | Oblank | 17 | 2 | 22 | 0.5 |
| Leftpane suppo 1 | Person 6 | 5 | ONeed Break...4 | | OBest effort | | ODebt | 9 | 0.5 | 17 | 2 |
| | 1 Selected | | OWaiting for... | 3 | ●CRITICAL | | OCraftsmans.. 9 | blank | 8 | 0 |
| Timeline view 1 | Person 1 | 55 | OStuck | 10 | | | OTests | 5 | 3 | 7 | 1.5 |
| Timeline call cl 1 | | | | | | | | | | | |

Save to this widget

| Task | Person 903 | Status | Priority | Type | SP | Actual SP |
|---|---|---|---|---|---|---|
| Subscribing gue 1 | Person 3  21 | ODone  19 | OLow | OIncrement  60 | 1 | blank |
| Add guest on su 1 | Person 4  14 | ODev ready  6 | OHigh | OBug  20 | .5 | .8 |
| Merge status on 1 | Person 5  13 | OMoved to f... 4 | OQ1 2020 | ON/A  21 | 0 | .4 |
| Remove 'share' 1 | Person 6  5 | OWorking on it  3 | OMedium | Oblank  16 | 2 | 0.2 |
| Leftpane suppo 1 | 2 Selected | ONeed Break...3 | OBest effort | ODebt  6 | 0.5 | 1 |
| Timeline view  1 | Person 1  40 | OWaiting for... 2 | ●CRITICAL | OCraftsmans.. 6 | blank  4 | 0 |
| Timeline call cl 1 | Person 2  30 | OStuck  8 | | OTests  3 | 3 | 1 |

Save to this widget

FIG. 9

| Task | Person | | Status | Priority | Type | SP | Actual SP |
|---|---|---|---|---|---|---|---|
| Subscribing gue 0 | | Person 3 | ○Done 0 | ○Low | ○Increment 0 | 1 | blank |
| Add guest on su 1 | | Person 4 | ○Dev ready 0 | ○High | ○Bug 1 | .5 | 1 |
| Merge status on 1 | | Person 5 | ○Moved to f… 0 | ○Q1 2020 | ○N/A 1 | 0 | .5 |
| Remove 'share' 0 | | Person 6 | ○Working on it 0 | ○Medium | ○blank 0 | 2 | .5 |
| Leftpane suppo 1 | 2 Selected | | ○Need Break… 0 | ○Best effort | ○Debt 1 | 0.5 | 2 |
| Timeline view 0 | | Person 1  5 | 1 Selected | ●CRITICAL | ○Craftsmans…0 | blank | 0 |
| Timeline call cl 0 | | Person 2  3 | ○Stuck 8 | | ○Tests 0 | 3 | 1 |

| Project 1 | Person | Task Details | Status | Priority | Timeline |
|---|---|---|---|---|---|
| Task 19 | Person 2 | Leftpane suppo | Stuck | Medium | June 19 – Aug 4 |
| Task 48 | Person 1 | Add guest on su | Stuck | Best Effort | Jan 1 – Sep 19 |
| Task 250 | Person 2 | Merge status on | Stuck | CRITICAL | May 6 – Jul 5 |

Filter by text | | =/1 | /Edit | © | □ | &/1 | …

Date Created: May 4

Author:

Last updated: May 5 at 13:05:59

Email

| Task | | Status | | Priority | Type | | SP | Actual SP |
|---|---|---|---|---|---|---|---|---|
| | Person | | | ○Low | ○Increment | 79 | 1 | blank |
| Subscribing gue 1 | Person 2  50 | ○Done | 139 | ○High | ○Bug | 25 | .5 | 1 |
| Add guest on su 1 | Person 3  21 | ○Dev ready | 8 | ○Q1 2020 | ○N/A | 24 | 0 | .5 |
| Merge status on 1 | Person 4  14 | ○Moved to f... | 5 | ○Medium | ○blank | 17 | 2 | 0.5 |
| Remove 'share' 1 | Person 5  13 | ○Working on it | 4 | ○Best effort | ○Debt | 9 | 0.5 | 2 |
| Leftpane suppo 1 | Person 6  5 | ○Need Break...4 | | ●CRITICAL | ○Craftsmans..9 | | blank | 0 |
| Timeline view 1 | 1 Selected | ○Waiting for... | 3 | | ○Tests | 5 | 3 | 7 |
| Timeline call cl 1 | Person 1  55 | ○Stuck | 5 | | | | | 1.5 |

Save to this widget

2403 — Person
2401 — Person 1

FIG. 24

| Task | Person | | Status | Priority | Type | | SP | Actual 5P |
|---|---|---|---|---|---|---|---|---|
| Subscribing gue 0 | | | ODone 0 | OLow | OIncrement | 60 | 1 | blank |
| Add guest on su 1 | Person 2 | 3 | ODev ready 0 | OHigh | OBug | 20 | .5 | 51 .8 |
| Merge status on 1 | Person 3 | 4 | OMoved to f... 0 | OQ1 2020 | ON/A | 21 | 0 | 17 .4 |
| Remove 'share' 1 | Person 4 | 10 | OWorking on it 0 | OMedium | Oblank | 16 | 2 | 17 0.2 |
| Leftpane suppo 1 | Person 5 | 8 | ONeed Break... 0 | OBest effort | ODebt | 6 | 0.5 | 16 1 |
| Timeline view 1 | Person 6 | 5 | 1 Selected | ●CRITICAL | OCraftsmans...6 | | blank | 10 0 |
| Timeline call cl 1 | 1 Selected | | OStuck 5 | | OTests | 3 | 3 | 4 3 1 |

| Task | Person | Status | | Priority | Type | | SP | | Actual SP |
|---|---|---|---|---|---|---|---|---|---|
| Subscribing gue | 0 Person 3 1 | ○Done | 0 | ○Low | ○Increment | 0 | 1 | 1 | blank |
| Add guest on su | 1 Person 4 3 | ○Dev ready | 0 | ○High | ○Bug | 1 | .5 | 0 | 1 |
| Merge status on | 1 Person 5 2 | ○Moved to f... | 0 | ○Q1 2020 | ○N/A | 1 | 0 | 0 | .5 |
| Remove 'share' | 0 Person 6 3 | ○Working on it | 0 | ○Medium | ○blank | 0 | 2 | 0 | .5 |
| Leftpane suppo | 1 Person 1 5 | ○Need Break... | 0 | ○Best effort | ○Debt | 1 | 0.5 | 2 | 2 |
| Timeline view | 0 Person 2 3 | 1 Selected | | ●CRITICAL | ○Craftsmans.. | 0 | blank | 0 | 0 |
| Timeline call cl | 0 | ○Stuck | 8 | | ○Tests | 0 | 3 | 0 | 1 |

2903a → Person (dashed box around Person 3-6)
2 Selected (Person 1, Person 2 highlighted)
2901a → (points to Person 2 row)

Save to this widget

FIG. 29A

| Task | Person | | Status | | Priority | | Type | | SP | Actual SP |
|---|---|---|---|---|---|---|---|---|---|---|
| Subscribing gue | Person 1 | 5 | ODone | 0 | OLow | | OIncrement | 60 | 1 | blank |
| Add guest on su | Person 3 | 4 | ODev ready | 0 | OHigh | | OBug | 20 | .5 | .8 |
| Merge status on | Person 4 | 10 | OMoved to f... | 0 | OQ1 2020 | | ON/A | 21 | 0 | .4 |
| Remove 'share' | Person 5 | 8 | OWorking on it | 0 | OMedium | | Oblank | 16 | 2 | 0.2 |
| Leftpane suppo | Person 6 | 5 | ONeed Break... | 0 | OBest effort | | ODebt | 6 | 0.5 | 1 |
| Timeline view | 1 Selected | | 1 Selected | | ●CRITICAL | | OCraftsmans.. | 6 | blank 4 | 0 |
| Timeline call cl | Person 2 | 3 | OStuck | 3 | | | OTests | 3 | 3 | 1 |

DIGITAL PROCESSING SYSTEMS AND METHODS FOR CUSTOMIZED CHART GENERATION BASED ON TABLE DATA SELECTION IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Consistent with some disclosed embodiments, systems, methods, and computer readable media for automatically filtering data in complex tables are disclosed. Systems, methods, devices, and non-transitory computer readable media may include at least one processor that is configured to display multiple headings including a first heading and a second heading. The at least one processor may be configured to receive a first selection of a first cell associated with the first heading, wherein the first cell may include a first category indicator. The at least one processor may be further configured to receive a second selection of a second cell associated with the first heading, wherein the second cell may include a second category indicator. The at least one processor may be further configured to receive a third selection of a third cell associated with the second heading, wherein the third cell may include a third category indicator. The at least one processor may be further configured to generate a logical filter for the complex table by joining with an "or," the first selection and the second selection associated with the first heading, the first selection and the second selection constituting a first group; and by joining with an "and," the third selection and the first group. The at least one processor may be further configured to apply the logical filter to the complex table. The at least one processor may be further configured, in response to application of the logical filter, to cause a display of a filtered collection of items from the first group that contain the third category indicator.

Consistent with some disclosed embodiments, systems, methods, and computer readable media for customizing chart generation based on table data selection are disclosed. Systems, methods, devices, and non-transitory computer readable media may include at least one processor that is configured to maintain at least one table containing rows, columns and cells at intersections of rows and columns. The at least one processor may be configured to receive a first selection of at least one cell in the at least one table. The at least one processor may be further configured to generate a graphical representation associated with the first selection of at least one other cell. The at least one processor may be further configured to generate a first selection-dependent link between the at least one table and the graphical representation, such that when information associated with the first selection is updated in the at least one table, the graphical representation changes. The at least one processor may be further configured to receive a second selection of at least one cell in the at least one table. The at least one processor may be further configured to alter the graphical representation based on the second selection. The at least one processor may be further configured generate a second selection-dependent link between the at least one table and the graphical representation, such that when information associated with the second selection is updated in the at least one table, the graphical representation changes.

BRIEF DESCRIPTION OF THE DRAWINGS

FIG. 4 illustrates another example of a complex table that includes multiple headings, consistent with some embodiments of the present disclosure.

FIG. 5 illustrates an example of a filter for filtering data in a complex table, consistent with some embodiments of the present disclosure.

FIG. 6 illustrates an example of a filtered complex table, consistent with some embodiments of the present disclosure.

FIG. 7 illustrates another example of a filtered complex table, consistent with some embodiments of the present disclosure.

FIG. 8 illustrates an example of a first selection of a first cell associated with a first heading, consistent with some embodiments of the present disclosure.

FIG. 9 illustrates an example of a second selection of a second cell associated with a first heading, consistent with some embodiments of the present disclosure.

FIG. 10 illustrates an example of a third selection of a third cell associated with a second heading, consistent with some embodiments of the present disclosure.

FIG. 16 illustrates an example of a complex table containing a filtered collection of items, consistent with some embodiments of the present disclosure.

FIG. 17 illustrates an example of a complex table containing metadata, consistent with some embodiments of the present disclosure.

FIG. 23 illustrates an exemplary table containing multiple columns, rows, and cells, consistent with some embodiments of the present disclosure.

FIG. 24 illustrates an exemplary table where a first selection of at least one cell in the table is received, consistent with some embodiments of the present disclosure.

FIG. 25 illustrates another exemplary table where a first selection of at least one other cell in the table is received, consistent with some embodiments of the present disclosure.

FIGS. 29A and 29B illustrate exemplary representations of a table in which another selection of at least one cell is received, consistent with some embodiments of the present disclosure.

FIG. 32 illustrates an exemplary table where a first selection is cancelled in response to a second selection, consistent with some embodiments of the present disclosure.

DETAILED DESCRIPTION

Figure 1:
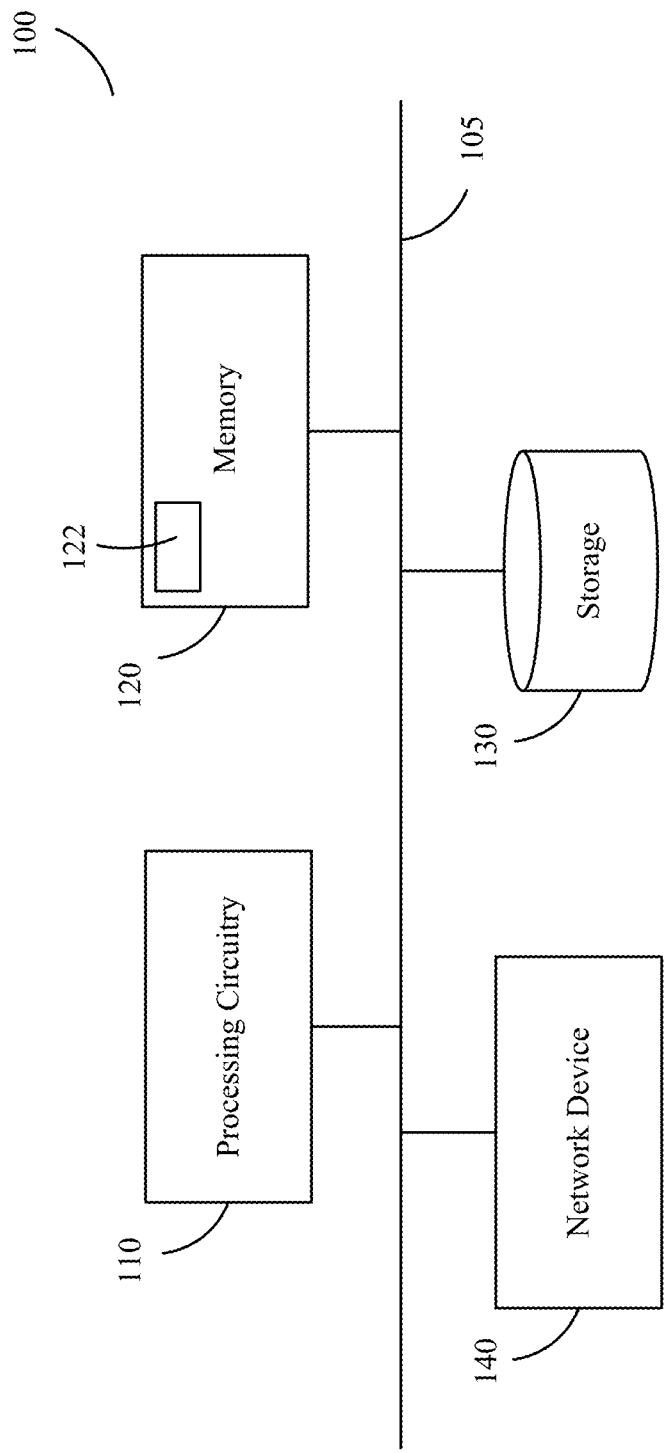
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
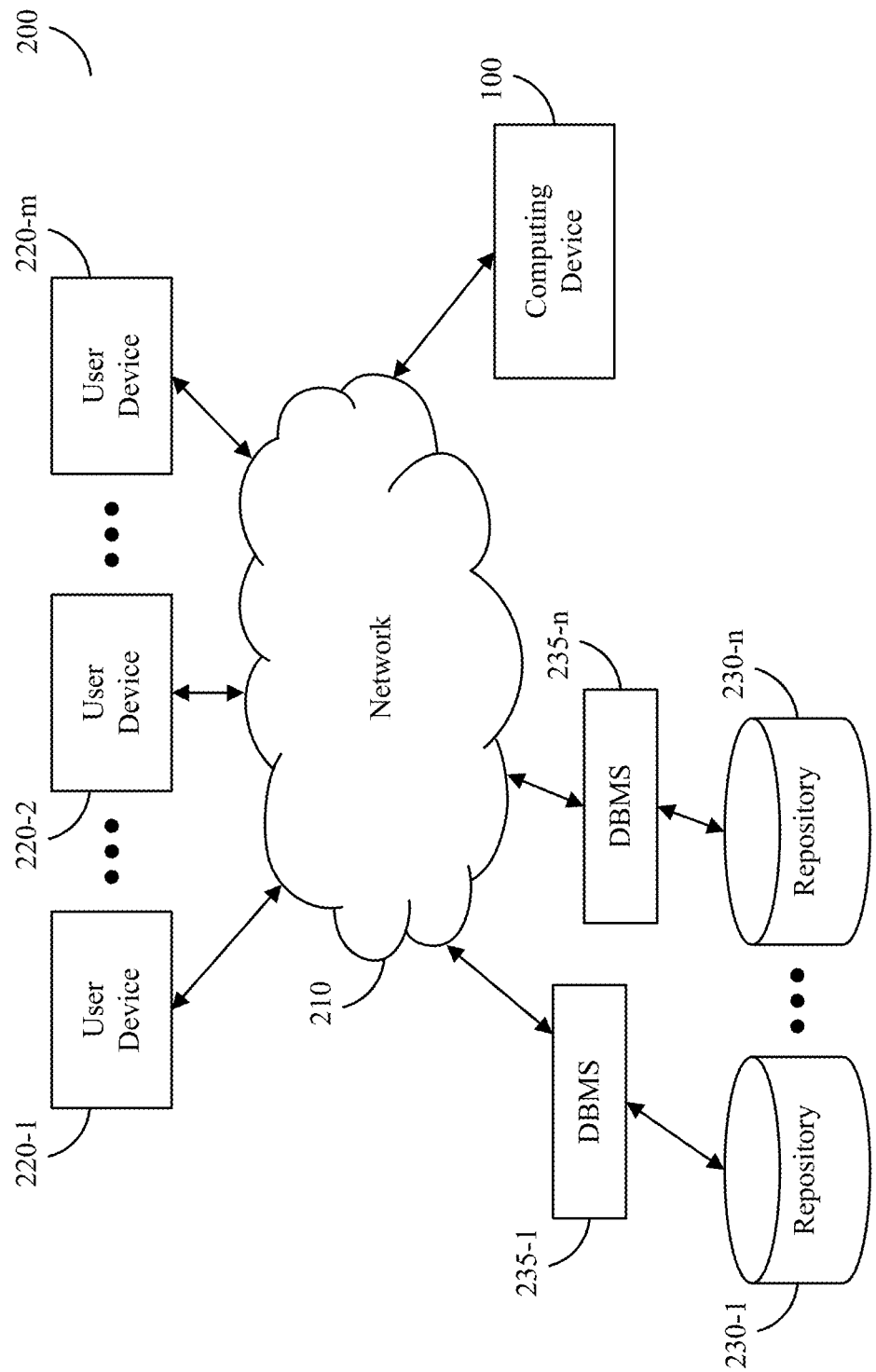
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-*n*. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Consistent with some disclosed embodiments, systems, methods, and computer readable media for automatically filtering data in complex tables are disclosed. Using computerized systems and methods for automatically filtering data in complex tables provides several advantages over extant processes that rely on inefficient graphical user interfaces for filtering data. For example, users may find it desirable to filter data by interacting with the complex table directly, without having to interact with a separate interface having logical functionality for filtering data. By making such logical functionality available through interactions with cells or elements in the complex table, time may be saved and user experience may be enhanced. Additionally, the disclosed computerized systems and methods may display filtered data in a manner that is intuitive and consistent with the user's interactions, such as by indicating a number of data matching the filtering criteria or generating a summary display containing the matching data directly on the complex table. Accordingly, the systems and methods disclosed herein may provide filtered information in a real-time or near real-time fashion, allowing the user to gain access to desired information faster than with extant systems and methods. Further, the disclosed computerized systems and methods may provide a more flexible and intuitive filtering experience than with extant systems and methods.

The systems, methods, and computer readable media disclosed herein may include at least one processor, such as a CPU, FPGA, ASIC, or any other processing structure(s), as described above. The at least one processor may be configured to automatically filter data in complex tables. Filtering data may include any action of segregating or identifying a subset of data from a data set for viewing or analysis. Filtering data may include selecting any information, features, or characteristics associated with one or more cells in a complex table to include a subset of the complex table, such as specific status values, projects, countries, persons, teams, progresses, or a combination thereof. Filtering data may be performed automatically without input from a user, such as through a logical rule, logical combination rule, logical templates, or any processing instruction. "Automatically" in this context may include one or more of an action in real-time, in near real-time, at a predetermined interval, integrated in a customized template, in sync with a customized template, manually, or in any manner in which input from the user is reduced or with which at least some portion of the action occurs without user input.

A complex table may refer to any structure for presenting data in an organized manner, such as cells presented in horizontal rows and vertical columns (e.g., tables or tablatures as described herein), a tree data structure, a web chart, or any other structured representation. A cell may refer to a unit of information contained in the complex table defined by the structure of the complex table. For example, a cell may be defined as an intersection between a horizontal row with a vertical column in a complex table having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement.

In some aspects of the disclosure, the at least one processor may be configured to display multiple headings including a first heading and a second heading, consistent with disclosed embodiments. "Display" may include outputting information in order to cause a presentation of information, whether that presentation is visual, tactile, or any other provision of information. In the cause of at least one processor being configured to display, the processor may output signals that either directly or indirectly cause the presentation of information. For this purpose, any suitable device may be used to present the outputted information. A display may be associated with one or more mobile devices, desktops, laptops, tablets, LED panel, augmented reality (AR) presenter, virtual reality (VR) presenter, or a combination thereof. Displaying a heading may include generating alphanumeric data, a graphical indication of a heading, a combination thereof, or any other indication of the heading. A complex table may include one or more headings defining or associated with a data type, such as status, project, country, person, team, progress, or any other feature or characteristic that may be associated with one or more cells. In embodiments where the complex table includes horizontal rows and vertical columns, a heading may be associated with a row, a column, or both. A complex table may include any combination of column headings with differing column headings, multiple column headings with the same column heading, or a combination thereof according to a default or user preference. The complex table may be altered to add or remove columns and alter any column heading regardless of the column's type. In some embodiments, complex tables may include two columns of differing column types with common column headings or even two columns of the same column type with differing column headings according to user preference.

Figure 3:
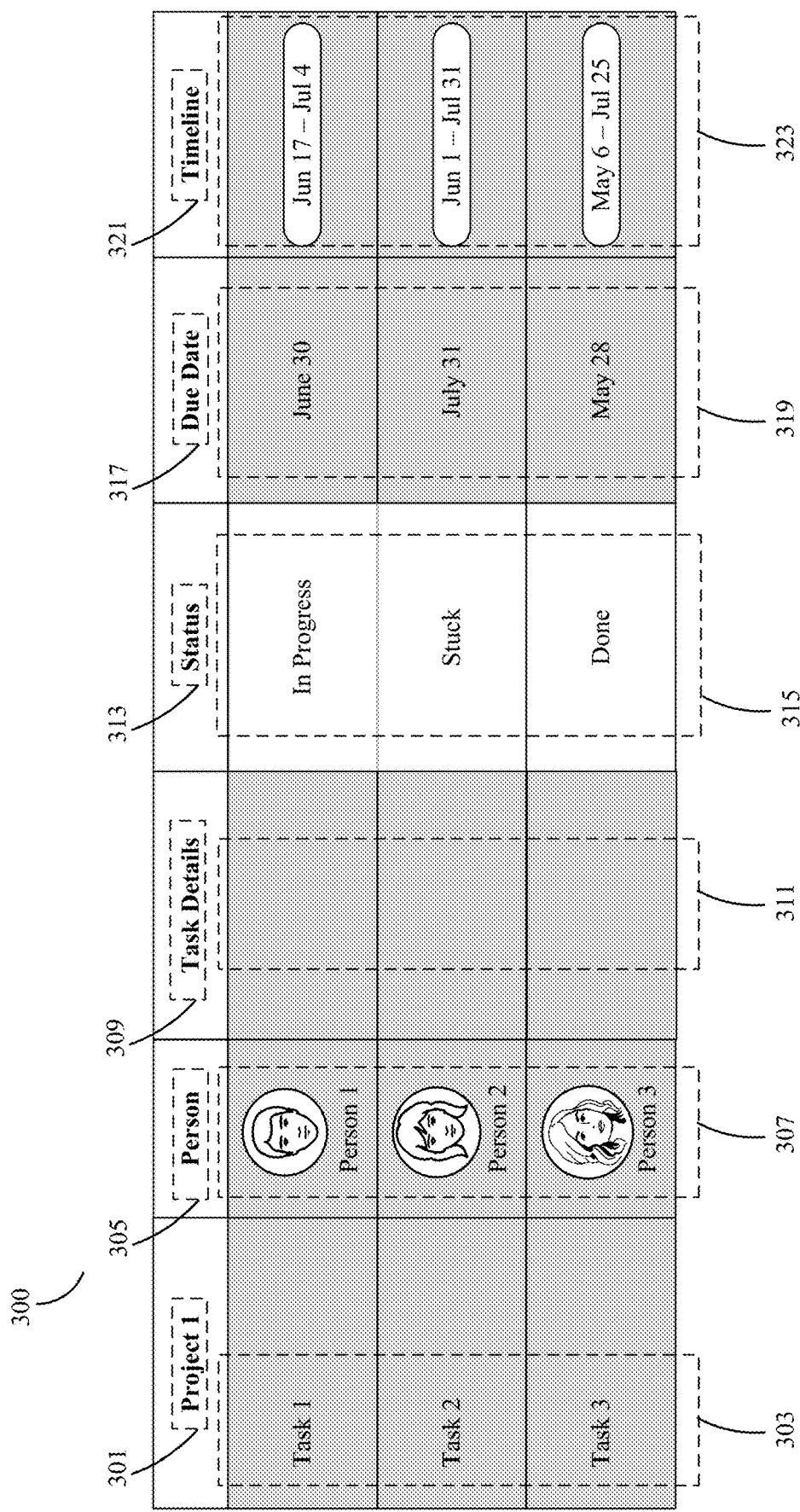
FIG. 3 illustrates an example of a complex table that includes multiple headings, consistent with some embodiments of the present disclosure.

For example, FIG. 3 illustrates an exemplary complex table 300 that may include multiple columns and rows having headings, consistent with embodiments of the present disclosure. In some embodiments, the table 300 and other information discussed in connection with other figures may be displayed using a computing device (e.g., computing device 100 illustrated in FIG. 1) or software running thereon. The presentation may occur via a display associated with computing device 100 or one or more of the user devices 220-1 to 220-*m* in FIG. 2. As shown in FIG. 3, the table 300 may include a "Project" heading 301 associated with a project (i.e., "Project 1") for display and may include, in the multiple rows and columns, cells corresponding to tasks (e.g., in rows including "Task 1," Task 2," or "Task 3" in column 303). The table 300 may also include a "Person" heading 305 associated with cells corresponding to persons assigned to a task (e.g., column 307), a "Task Details" heading 309 associated with cells corresponding to additional information related to the task (e.g., column 311), a "Status" heading 313 associated with cells corresponding to the state of the task (e.g., column 315), a "Due Date" heading 317 associated with cells corresponding to a deadline of the task (e.g., column 319) of the task, and a "Timeline" heading 321 associated with cells corresponding with progress over time of the task (e.g., column 323), or any information, characteristic, or associated entity of the project. The complex table 300 may include any number of columns and may include multiple columns with the same column heading with the same column type, or may include multiple columns with the same column heading with a different column type. For example, complex table 300 may be altered to change "Person" heading 305 to include the text "Task Details" identical to "Task Details" heading 309 despite the fact that person column 307 is a different column type from task column 311. It may be possible for a two columns of differing column types to have the same column heading and it may be possible for two columns of the same column type to have different column headings according to user preference.

FIG. 4 illustrates another exemplary complex table 400 that may include a first heading and a second heading, consistent with disclosed embodiments. In FIG. 4, a first heading to be displayed may be heading 401 ("Person") and a second heading to be displayed may be heading 403 ("Status"). As shown on FIG. 4, headings may be represented as text, graphics, symbols, shapes, images, videos, or any other categorical representation.

FIG. 5 illustrates an exemplary filter 501 for updating complex table 500, consistent with embodiments of the present disclosure. The complex table 500 in FIG. 5 may include an interactive element 503 (e.g., a button). The interactive element 503 may include a link to every cell containing information associated with or contain a shared characteristic with the interactive element 503. By selecting the interactive element 503, as illustrated in FIG. 5, the at least one processor may cause to display an interactive element (e.g., a floating GUI element overlaying the complex table 500) showing the filter 501. The filter 501 may include multiple buttons (or any other interactive elements), each button representing a feature or a characteristic (e.g., specific cell values) in the complex table 500. By selecting one or more of the buttons, the filter 501 may activate or select the features or characteristics associated or linked with the selected buttons for generating filtered information. For example, by selecting "CRITICAL" in the "Priority" column of the filter 501, the at least one processor may update the complex table 500 to display only information of tasks having the status "CRITICAL" as shown in FIG. 6.

FIG. 6 illustrates an example of filtered complex table 600, consistent with embodiments of the present disclosure. For example, the filtered complex table 600 may be the complex table 500 after applying the filter 501 (e.g., by clicking one or more buttons therein) as illustrated and described in association with FIG. 5. As shown in FIG. 6, the filtered complex table 600 includes only those tasks where the priority status is "CRITICAL" as illustrated in the "Priority" column 601.

FIG. 7 illustrates another exemplary filtered complex table 700, consistent with embodiments of the present disclosure. For example, the filtered complex table 700 may be the complex table 400 after applying a filter generated by selecting one or more buttons therein, such as "CRITICAL" button 701. As shown, as a result of selecting the "CRITICAL" button 701, the button may contain a number (e.g., "174") indicating the number of cells matching the filtering criteria. In FIG. 7, the number "174" indicates the number of cells with the status "CRITICAL" in the complex table 700. As can be appreciated from comparing FIG. 6 with FIG. 7, filtering operations may be received from a filter separate from the complex table (as in FIG. 6) or from the complex table itself (as in FIG. 7).

The at least one processor may be configured to receive a first selection of a first cell associated with a first heading, wherein the first cell includes a first category indicator, consistent with disclosed embodiments. A selection may include any user action, such as a mouse click, a cursor hover, a mouseover, a button press, a keyboard input, a voice command, an interaction performed in virtual or augmented reality, or any other action by a user received via the at least one processor. In embodiments where the complex table includes horizontal rows and vertical columns, the first cell may be part of a first column containing a first heading. (As used herein, designations such as first, second, third, etc. do not necessarily refer to a position, but are rather used to distinguish one from another.) The first cell may be any cell associated with the complex table associated with a corresponding category indicator (e.g., a heading).

Each cell may include a category indicator for representing a feature, characteristic, or information associated with the cell (e.g., a status, a date, or any other data associated with the cell). The category indicator may be any depiction suitable for the cell, including one or more pictures, alphanumeric characters, avatars, videos, VR or AR objects, graphs, metadata, or any combination thereof. For example, in embodiments where a cell is associated with a heading corresponding to persons in a project, the cell may include a graphical representation of the person associated with the cell such as a picture, avatar, name initials, or any other representation of the person. It is to be understood that any kind of category indicator may be used depending on the cell and information contained therein, and the disclosed embodiments are therefore not limited to any specific type of category indicator.

For example, in FIG. 4 each cell associated with the "Person" heading 401 includes a picture of the associated person and text (e.g., "Person 1") represented by each cell. Although a picture and text are used in this example, any other category indicator may be used to represent a person, such as a color indicator, a graphical icon, a sound, or any other visual or audio indicator. FIG. 8 illustrates an exemplary complex table 800 where a first selection has been received, consistent with disclosed embodiments. In FIG. 8, a first cell 801 ("Person 1") associated with first heading 803 ("Person") is selected, for example, by clicking on first cell 801. As shown in FIG. 8, first cell 801 may include a first category indicator 805 illustrated as a graphical indicator and text "Person 1."

The at least one processor may also be configured to receive a second selection of a second cell associated with the first heading, wherein the first cell includes a second category indicator, consistent with disclosed embodiments. In embodiments where the complex table includes horizontal rows and vertical columns, the second cell may be part of a first column containing a first heading. The second cell may be a different cell from the first cell of the first column. In other embodiments, the second cell may be any cell associated with the complex table in a second column, and it need not be limited to any particular column until a selection is made for the second cell.

For example, FIG. 9 illustrates an exemplary complex table 900 where a second selection has been received, consistent with disclosed embodiments. In FIG. 9, a second cell 901 ("Person 2") associated with first heading 903 ("Person") is selected, for example, by selecting second cell 901. As shown in FIG. 9, second cell 901 may include a second category indicator 905 illustrated as a graphical indicator and text "Person 2." Consistent with some embodiments of the disclosure, the second category indicator may also be presented graphically (e.g., shapes, colors, images), textually (e.g., words), or a combination thereof.

The at least one processor may be configured to receive a third selection of a third cell associated with the second heading, wherein the third cell includes a third category indicator, consistent with disclosed embodiments. In embodiments where the complex table includes horizontal rows and vertical columns, the third cell may be part of a second column containing a second heading. The second column may be any other column associated with the complex table that is different from the first column.

For example, FIG. 10 illustrates an exemplary complex table 1000 where a third selection has been received, consistent with disclosed embodiments. In FIG. 10, a third cell 1001 with a third category indicator (e.g., "stuck") associated with second heading 1003 ("Status") is selected, for example, by clicking on the third cell 1001. As shown in FIG. 10, third cell 1001 may include a third category indicator 1005 illustrated as a colored circle (e.g., a red circle) and text "Stuck." Consistent with some embodiments of the disclosure, the third category indicator may also be presented graphically (e.g., shapes, colors, images), textually (e.g., words), or a combination thereof.

The at least one processor may be configured to generate a real time indicator of a number of received selections, consistent with disclosed embodiments. A real time indicator in this context indicates any representation of the number of received selection, including one or more pictures, alphanumeric characters, avatars, videos, VR or AR objects, graphs, or any combination thereof, which is generated in real-time, in near real-time, at a predetermined interval, integrated in a customized template, in sync with a customized template, manually, or in any manner in which the indicator is generated in quick succession following the selection. A number of received selections may include any indication of category indicators that have been chosen by a user for generating a subset of data from the complex table.

For example, in FIG. 8, an indicator ("1 Selected") is shown above a first cell 801 ("Person 1") that has been selected, representing the number of received selections of persons in the column associated with "Person" heading 803. In this case, because one person (e.g., a category indicator) has been selected, the number of received selections is "1." This indication for the number of received selections may be presented in any format such as a graphical format, alphanumeric format, or a combination thereof. For example, the indicator for the number of received selections may be presented numerically, graphically, or symbolically (such as in the form of a representation of an inanimate or animate object or set of objects), or via any other combination of graphics and alphanumerics.

Similarly, in FIG. 9, an indicator ("2 Selected") is shown above the first cell ("Person 1") and second cell 905 ("Person 2"). In this example, because two persons (e.g., two category indicators) have been selected, the number of received selections is updated to "2." Where the category indicator is presented in a different format, the category indicator may be updated in any way to indicate an update to the number of received selections. For example, where the number of selections is represented by a depiction of an animal, there may appear a second depiction of another animal to represent the new selection. In a similar example where a depiction of an animal represents a single selection, in response to the system receiving a second selection, the depiction of the animal may increase in size to indicate that an additional selection has been made.

The at least one processor may be configured to generate a logical filter for the complex table, consistent with disclosed embodiments. A logical filter may include one or more operations for linking selected information, features, or characteristics associated with one or more cells in the complex table to thereby generate a subset of data from the complex table. Linking operations may include associating together all of the underlying information (e.g., in cells) in the complex table that meet the selected information, features or characteristics. The logical filter may be generated as one or more instructions, signals, logic tables, or any form suitable for performing functions in conjunction with the one or more linking operations. In some embodiments, a logical filter may include an "OR" operator for filtering data in such a way that resulting data may contain the information, feature, or characteristic associated with any of the filters to which the operator applies in an inclusive manner. For example, when a logical filter segregates tasks associated with a project based on a first person and a second person, the resulting tasks after the OR operator may be associated with either the first person or the second person. In some embodiments, a logical filter may include an "AND" operator for filtering data to contain the information, feature, or characteristic associated only with all of the filter conditions applied. Continuing the example above, the resulting tasks after the AND operator may be associated with both the first person and the second person, and not with tasks failing to meet the filter conditions that both the first person and the second person are associated with. In some embodiments, the at least one processor may be further configured to regenerate the logical filter in response to an input to provide additional filter options. Regenerating the logical filter may include a re-rendering of an interface associated with the logical filter. Regenerating the logical filter may include presenting altered filter options (e.g., addition, removal, rearrangement, or any other modification to filter options) or additional filter options that may enable a user to specify in more detail the information they may wish to filter. The regeneration may occur in response to an input received by the system from any interface (e.g., mouse, keyboard, touchscreen, and so on) to indicate an intent to regenerate the logical filter. For example, a user may provide an input (e.g., selecting a button such as "advanced filter") to regenerate the logical filter to present more granular filtering options that may not have been previously available on the original logical filter. As a result of the regeneration, a user may be presented with additional filter options such as options to directly alter inclusion of "AND" and "OR" logical connectors and selecting information from varying boards containing information.

The at least one processor may be configured to join with an "or" the first selection and the second selection associated with the first heading, the first selection and the second selection constituting a first group. "Joining" may refer to any manipulation of two or more values or variables using operations associated with the logical filter. For example, a bitwise operation may be used to implement an AND or an OR operation between two or more filters. It is to be understood, however, that any suitable method of manipulating data may be used in conjunction with disclosed embodiments, including but not limited to automated scripts, truth tables, manual operations, a combination thereof, or any other technique for handling or processing data. When a first selection and second selection are made under a common first heading, the first and second selection may be joined with an "or," which may result in selecting any task that may be associated with the first selection, the second selection, or a combination of both selections in an inclusive manner.

For example, FIG. 9 shows an exemplary logical filter (which may be presented as a table) with a first selection (e.g., "Person 1") and a second selection (e.g., "Person 2") that both are under a common heading (e.g., "Person" heading and column). As a result of the first and second selection, the logical filter may select all tasks of the underlying complex table (not shown) associated with "Person 1" or "Person 2" in an inclusive manner.

Figure 11:
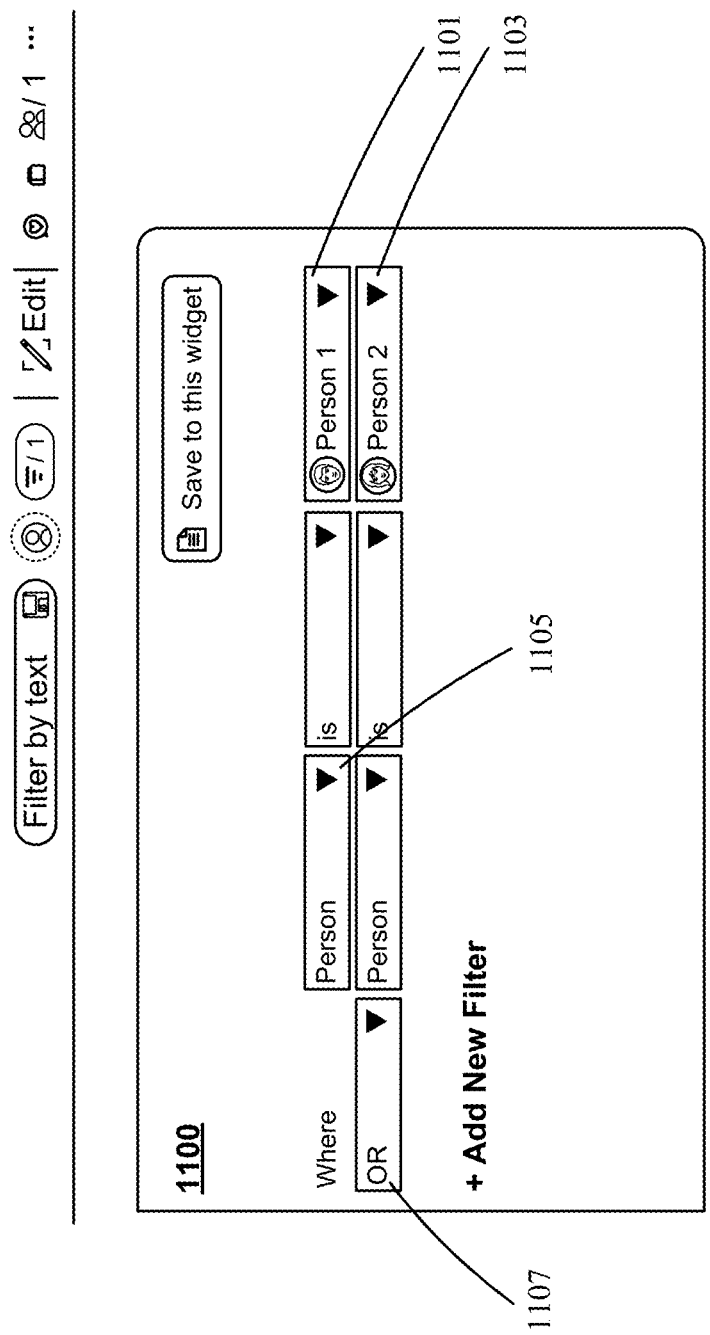
FIG. 11 illustrates an example of an operation for joining with an "or" two or more selections, consistent with some embodiments of the present disclosure.

In another example, FIG. 11 is an exemplary logical filter 1100 (which may be presented as a table) illustrating another embodiment of joining with an "or" the first selection and the second selection associated with the first heading. The joining may be a result of the selection of first cell or category indicator 1101 ("Person 1") and second cell or category indicator 1103 ("Person 2") associated with first heading 1105 ("Person"). As shown, the first selection and the second selections are joined with "OR" operator 1107. As a result of the operation, tasks associated with either Person 1 or Person 2 may be outputted (not shown).

The at least one processor may be configured to join with an "and" the third selection and the first group. Based on this operation, the information, features, or characteristics resulting from the operations may result in those items (or tasks) associated with the first group that includes either the first selection or the second selection, but only for those items associated with the third selection, consistent with the description above. In this manner, the user may perform intuitive and straightforward operations when filtering through desired information present in the complex table.

FIG. 10 shows another example of a logical filter (which may be presented as a table) with a first group containing a first selection ("Person 1") and a second selection ("Person 2") and a third selection ("Stuck"). Because the first selection and the second selection are under a common heading, the selections are joined with an "or." However, because the third selection is made from a differing heading from the first group, the third selection is joined with the first group with an "and." In this manner, only items or tasks from the underlying complex table associated with the first group (e.g., the first or second selections) and the third selection are selected or filtered for further presentation or action.

Figure 12:
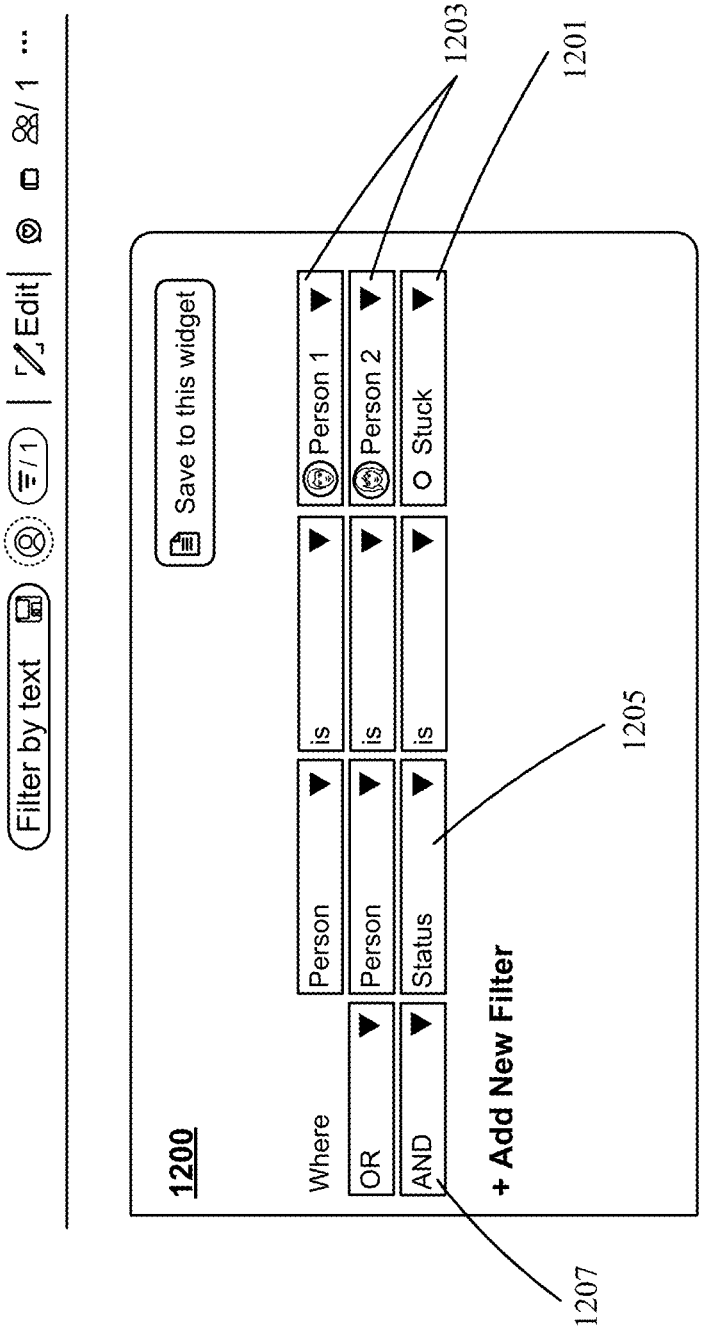
FIG. 12 illustrates an example of an operation for joining with an "and" two or more selections, consistent with some embodiments of the present disclosure.

FIG. 12 shows another example of a logical filter 1200 (which may be presented as a table) illustrating joinder with an "and" of the third selection and the first group including the first selection and the second selection. The joinder may be a result of the selection of third cell 1201 ("Stuck") associated with second heading 1207 ("Status") following, for example, selection of first group 1203 ("Person 1" and "Person 2") as explained above in connection with FIG. 11. As shown in FIG. 12, the third selection and the first group are joined with AND operator 1207. As a result of the operation, tasks associated wither either Person 1 or Person 2 where the status of the project is "Stuck" may be outputted (not shown).

The at least one processor may be configured to apply the logical filter to the complex table, consistent with disclosed embodiments. The logical filter may be applied through the performance of processing of data in the table. The processing may involve one or more functions employed on one or more cells, values, variables, or any other information associated with the complex table. In this manner, the data in the complex table may be filtered by a specified operation (e.g., OR or AND).

The at least one processor may be configured to apply the logical filter in real time to each selection. Consistent with the definition above, in "real time" in this context may occur in real-time, in near real-time, at a predetermined interval, integrated in a customized template, in sync with a customized template, manually, or in any manner in which a logical filter is applied in quick succession following the selection. Applying the logical filter may include linking the selections made to the underlying complex table for further action or presentation. Linking the selections may include associating together all of the underlying information (e.g., items or tasks) in the complex table that meet the conditions of the logical filter. For example, associating all of the underlying items or tasks in the complex table together may include generating a collection of those items and tasks as a new group so that those items and tasks that meet the logical filter do not have to be individually selected in the complex table for further action.

The at least one processor may be configured to cause the logical filter to be saved in memory for later application. The logical filter may be stored in a local memory on a user device, in a local network, and/or in one or more remote servers. The memory may include any mechanism capable of storing information, such as a hard drive, an optical drive, or a flash memory, as described above. The at least one processor may cause the logical filter to be saved automatically or as a result of a user instruction. For example, a user may select an interactive element (e.g., a button labeled "Save this widget"), causing the at least one processor to save the logical filter as part of information associated with the complex table. In this manner, data contained in the complex table may be filtered with the desired logical filter(s) when the data is displayed, thereby saving time and leading to a more enjoyable user experience. Further, the logical filter may be accessed and used by any secondary user who has permission to access the logical filter in the memory.

The at least one processor may be configured to cause the logical filter to be saved in a repository for application to a summary view of the complex table. A repository may include a database to manage digital content, such as databases to add, edit, delete, search, access, import, export, or manage content. Using the repository, the logical filter may be applied to a summary view of the complex table. A summary view may include a presentation of information that presents representative characteristics or features of a group of cells but not all of their details. For example, the summary view may include any combination of a list, a chart (e.g., a bar chart, a pie chart, or a line chart), a symbol, a picture, a number, a timeline, a word cloud, a calendar, a report, an information feed, an animation, or any other representation of representative characteristics or features.

Figure 13:
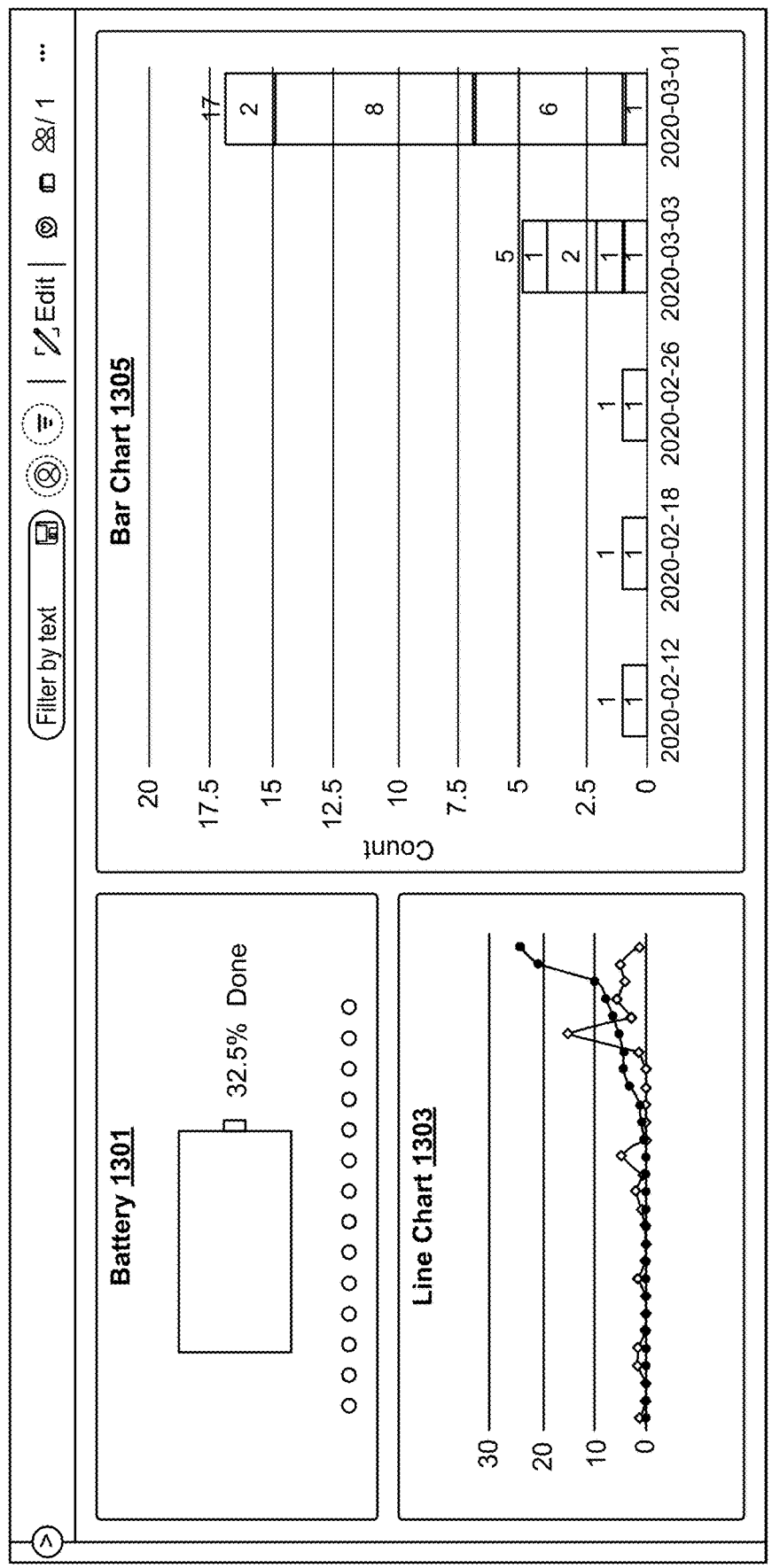
FIG. 13 illustrates an example of a summary view, consistent with some embodiments of the present disclosure.

By way of example, FIG. 13 illustrates an example of summary view 1300 of a complex table, consistent with embodiments of the present disclosure. The presentation may occur via a display associated with computing device 100 or one or more of the user devices 220-1 to 220-m in FIG. 2. By way of example only, summary view 1300 may include a depiction of a battery 1301 that represents overall progress information of a complex table (not shown in FIG. 13), a line chart 1303 that represents information of planned progress versus actual progress extracted from the complex table, and a bar chart 1305 that represents information of status by week extracted from the complex table.

The depiction of a battery 1301 shows a battery-shape representation that consolidates all of the statuses of the tasks included in the complex table, such as "done," "in progress," "stuck," "waiting," "delayed," or any other status value in the complex table. As illustrated in this example, the depiction of a battery 1301 includes the text "32.5% done" reflecting that 32.5% of the tasks associated with the statuses are "Done." That is, of all the tasks included in the complex table, 32.5% are completed. This text may be a default or may be configured to present the percentage makeup or any of the status values in the complex table.

The exemplary line chart 1303 shows two lines, a line of black dots and a line of circle dots. Each black dot of the line of black dots may represent a planned progress of a task included in the complex table, and each circle dot of the line of circle dots may represent an actual progress of a task included in the complex table. The line chart may be a default or may be configured according to user preference.

The exemplary bar chart 1305 shows five bars, each bar including one or more statuses associated with a single week (e.g., the week of "2020-02-12," the week of "2020-02-18," and so on). That is, each bar may represent all of the statuses updated or changed within one week for their associated tasks. The bar chart may be a default or may be configured according to user preference.

Figure 14:
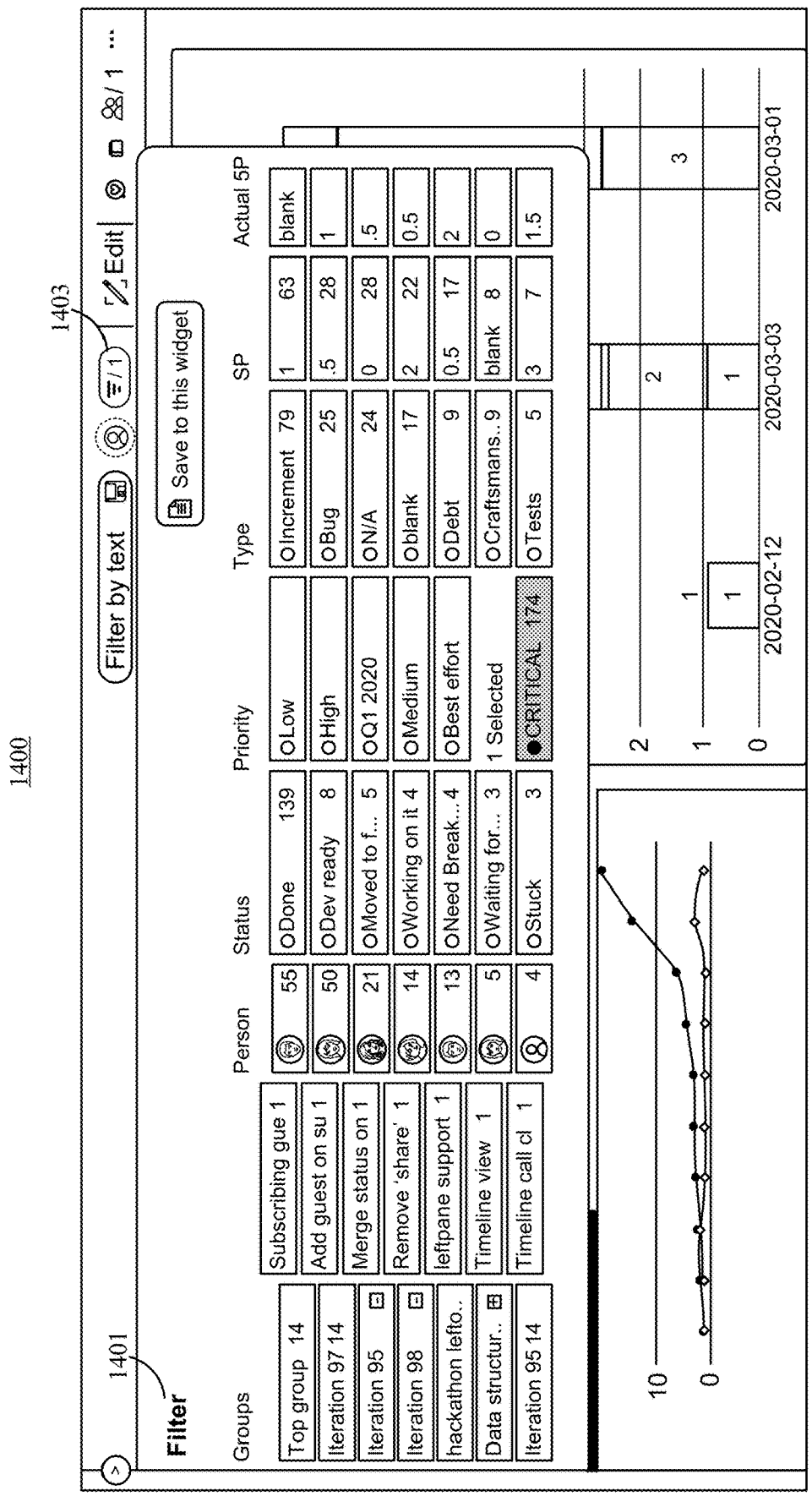
FIG. 14 illustrates an example of a filter for filtering data in a summary view, consistent with some embodiments of the present disclosure.

FIG. 14 illustrates an exemplary filter 1401 for updating summary view 1400 representative of data contained within each of the columns such that specific data may be represented as a proportion of all of the data contained within each column. The summary view 1400 in FIG. 14 includes an interactive element 1403 (e.g., a button). By selecting the interactive element 1403, as illustrated in FIG. 14, the at least one processor may cause to display an interactive element (e.g., a floating GUI element overlaying the summary view 1400) showing the filter 1401. The filter 1401 may include multiple buttons, each button representing a feature or a characteristic (e.g., specific cell values) in the complex table associated with the summary view 1400. By selecting one or more of the buttons, the filter 1401 may activate the features or characteristics associated with the selected buttons for generating a filtered summary view. For example, by selecting on a button "CRITICAL 174" (representing that 174 tasks have the status "CRITICAL" in the complex table) in the "Priority" column of the filter 1401, the at least one processor may update the summary view 1400 to display only summary information of tasks having the status "CRITICAL."

Figure 15:
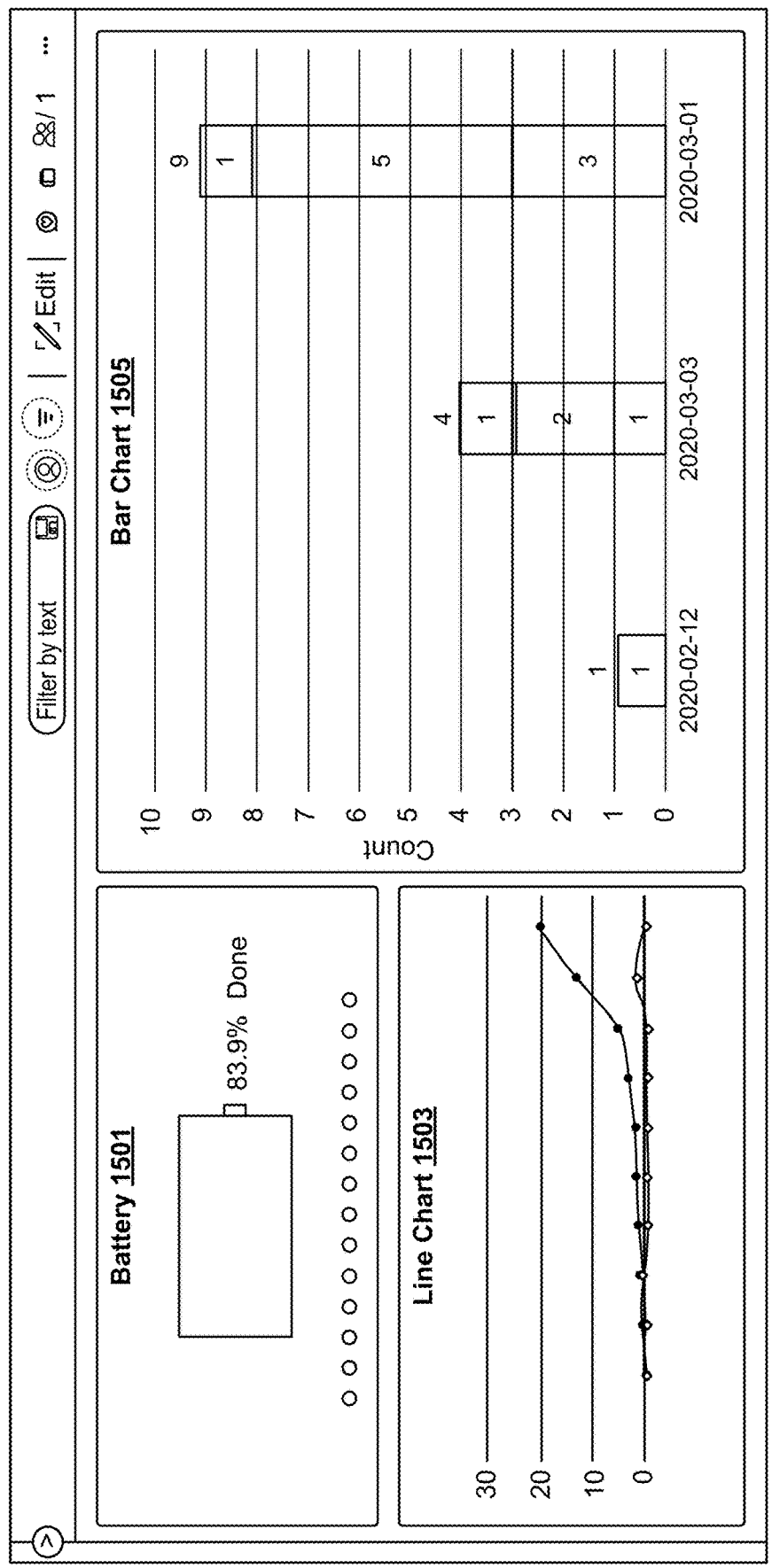
FIG. 15 illustrates an example of a filtered summary view, consistent with some embodiments of the present disclosure.

FIG. 15 illustrates an example of a resulting filtered summary view 1500 after applying filter 1401 discussed above in connection with FIG. 14, consistent with embodiments of the present disclosure.

The at least one processor may be configured to, in response to application of the logical filter, cause a display of a filtered collection of items from the first group that contain the third category indicator. A display, as discussed previously, may be caused to present a filtered collection of items corresponding to the cells, values, variables, or other information that may result from applying the logical filter as described above. The filtered collection of items of the underlying complex table may then be further processed for display. The collection of items may include information associated with the first group, such as the first selection and the second selection, containing the third category indicator. In this manner, items associated with either the first selection or the second selection, but only those associated with the third selection, may be selected in an intuitive and straightforward manner.

Figure 16:
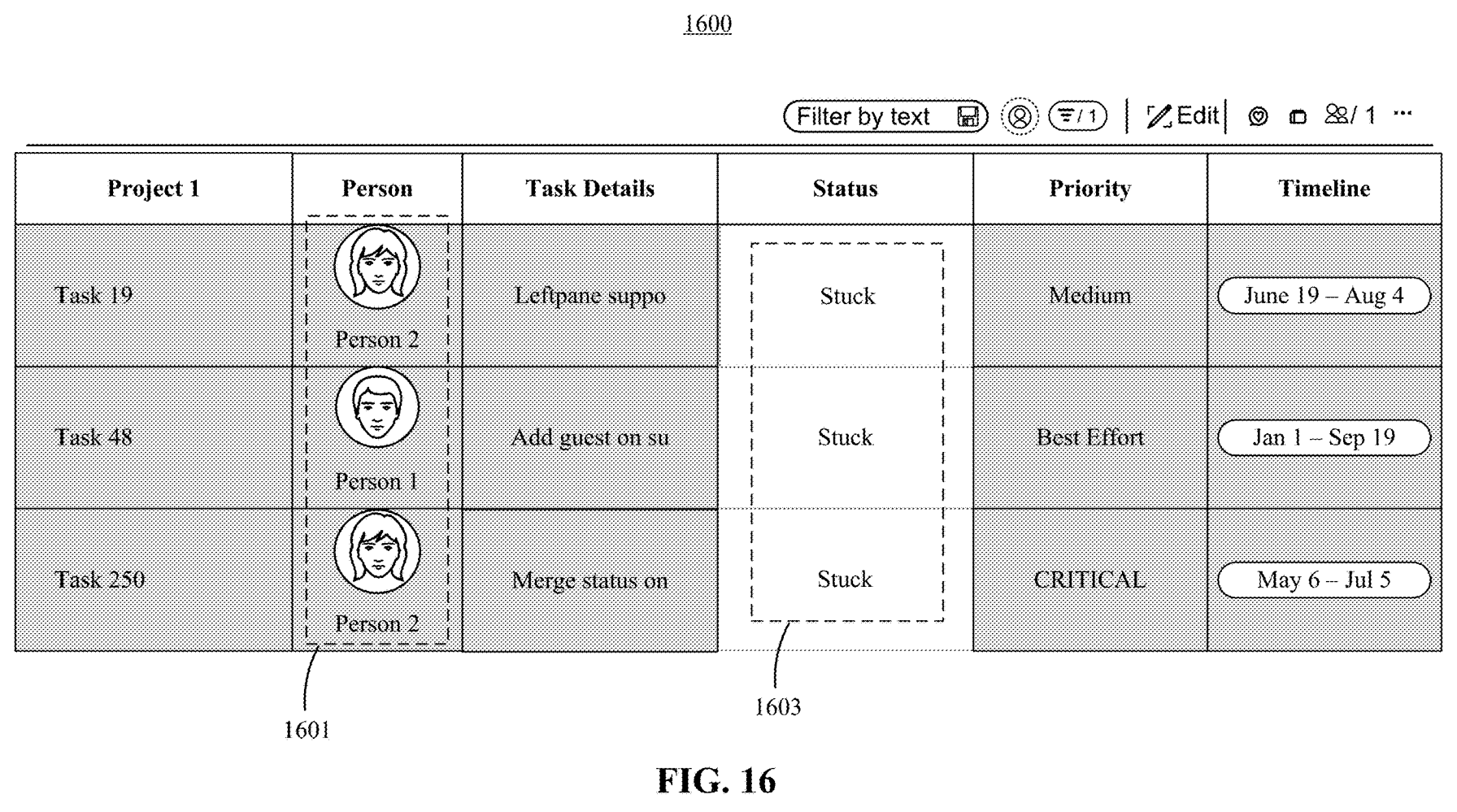

FIG. 16 is an exemplary complex table 1600 including a filtered collection of items from a first group 1601 that contain a third category indicator 1603. For example, complex table 1600 may be displayed as a result of a first selection (e.g., selection of first cell 801 described above in connection with FIG. 8) and a second selection (e.g., selection of second cell 901 described above in connection with FIG. 9) constituting first group 1601, and a third selection (e.g., selection of third cell 1001 described above in connection with FIG. 10). However, in other embodiments, the selections may be received directly from complex table 1600. As shown, complex table 1600 may display only those items in first group 1601 that contain a third category indicator 1603, which in this case is a color (e.g., red) and the text "Stuck."

In some embodiments, the at least one processor may be configured to calculate and display a number of times that the first category indicator appears under the first heading. The number of times that a category indicator appears under a heading may be calculated using any process for computing a total number of instances of the category indicator appearing in the complex table, such as arithmetic computations, binary arithmetic, or any other process for mathematically transforming one or more inputs into one or more outputs. For example, in embodiments where the complex table includes vertical columns and horizontal rows, the number of cells containing the first category indicator in each column associated with the first heading may be tallied to calculate the number of times that the first category indicator appears under the first heading. The resulting calculation may then be displayed using any visual, tactile, or any other generation of physical information, such as through the use of one or more mobile devices, desktops, laptops, tablets, LED, AR, VR, or a combination thereof, as described above. The calculation of the number of times that the category indicator appears may be updated according to updates made in the complex table or in the logical filter.

For example, in FIG. 8 a logical filter 800 (which may be presented as a table) may contain an indication of the number of times that a category indicator 805 appears under a heading in the complex table. In FIG. 8, total number "55" associated with the selection 801 of Person 1 represents the number of times that category indicator 805 (e.g., a profile picture for "Person 1") appears in the complex table. For example, such an indication may represent the number of times an individual in a project is present in a column associated with "Person" heading 803. As the number of times an individual is assigned to particular items or tasks is changed in the complex table, the same number may be updated in the logical filter 800. While represented textually in FIG. 8, the number of times may also (or alternatively) be presented graphically or as a combination of graphics and alphanumerics.

Consistent with some disclosed embodiments, the at least one processor may be configured to reduce the displayed number of times following receipt of the third selection. As a result of additional selections made, the number of times a category indicator may be updated to reflect the number of items or tasks that meet the updated logical filter. The reduction of the number of times that a category indicator may appear under a heading may be calculated in the same or similar manner as described above in connection with the initial calculation (e.g., arithmetic computations, binary arithmetic, or any other process for mathematically transforming one or more inputs into one or more outputs). Following the example above, upon receipt of the third selection (joining an "and" logic that excludes data), the number of cells not associated with the third selection may be subtracted from the number of times that the first category indicator appears under the first heading. As a further example, the number of cells containing the first category indicator in each column associated with the first heading may be tallied to calculate the number to be displayed, but only if associated with the third selection.

For example, comparing FIG. 9 and FIG. 10 shows that the displayed number associated with the first selection (e.g., selection of "Person 1" cell 801 described in connection with FIG. 8) is reduced in cell 901. Specifically, as shown in FIG. 9, the displayed number in the "Person 1" cell is "40," indicating that 40 cells in the column associated with "Person" heading 903 are associated with Person 1. As shown in FIG. 10, following a third selection (e.g., selection of "Stuck" cell 1001 described above in connection with FIG. 10), the displayed number in the "Person 1" cell is reduced to "5," indicating that only five cells in the column associated with the "Person" heading is associated with Person 1 where the status of the task is "Stuck."

In some embodiments, causing a display of the filtered collection includes displaying metadata associated with at least one item of the collection. Metadata may include any data related to the at least one item of the collection, such as tags, author, date created, date modified, file size, a combination thereof, or any other information corresponding to the data represented by the at least one item of the collection. It is to be understood that metadata may include any information related to the data corresponding to the at least one item of the collection.

For example, FIG. 17 illustrates a complex table 1700 that may contain metadata associated with at least one item of the collection, consistent with disclosed embodiments. As shown in FIG. 17, metadata 1701 associated with a cell (e.g., "Task 250") may be displayed. Metadata 1701 may include any information associated with the cell, in this case a task, such as the creator the author of the task, the creation date of the task, the date of the last update of the task, and email information for the author of the task. Any other metadata information may be included, as described above.

Figure 18:
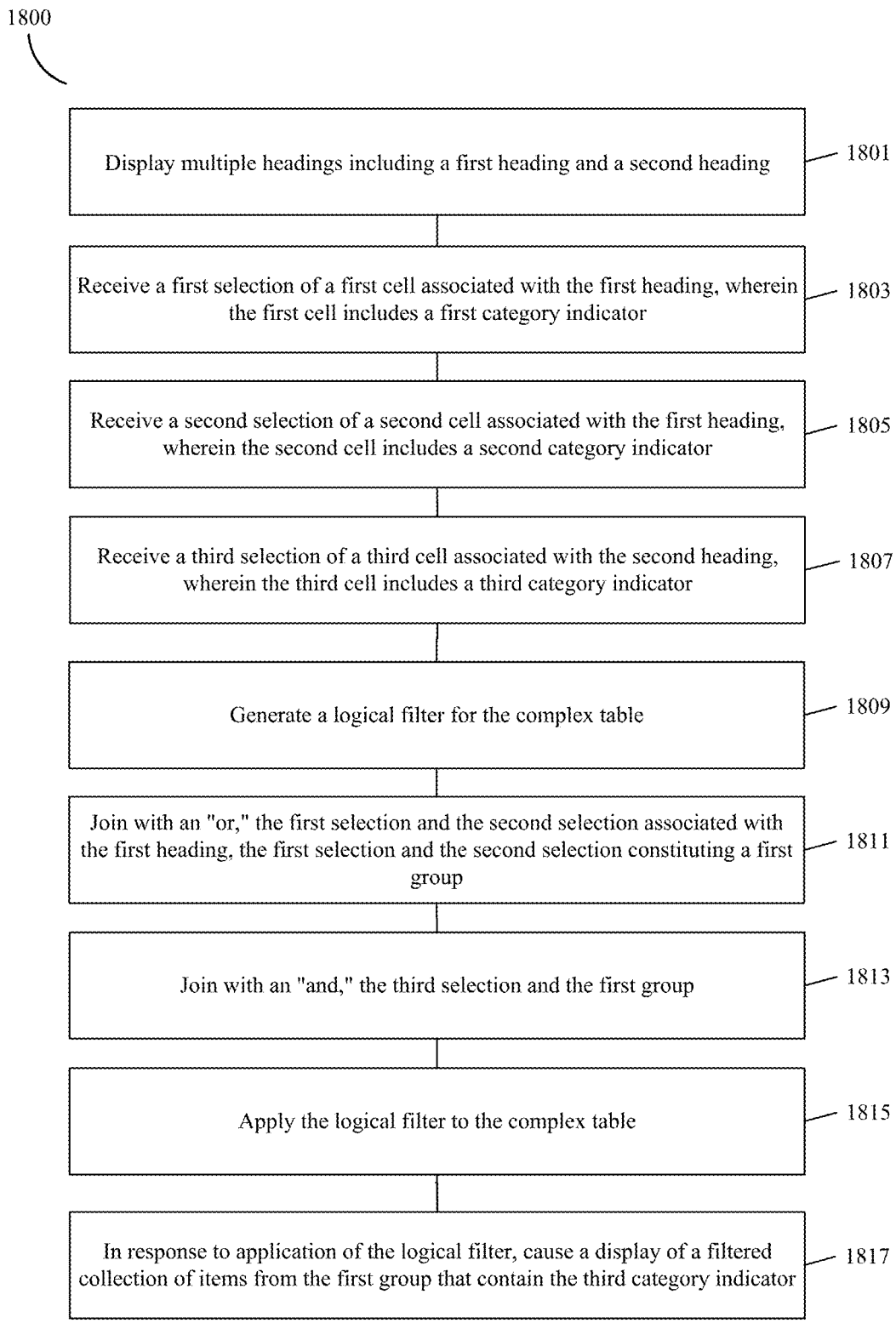
FIG. 18 is a block diagram of an example process for automatically filtering data, consistent with some embodiments of the present disclosure.

FIG. 18 illustrates a block diagram of an example process 1800 for automatically filtering data in complex tables, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 1800 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 3 to 17 by way of example. In some embodiments, some aspects of the process 1800 may be implemented as software (e.g., program codes or instructions) that are stored in a memory (e.g., the memory portion 122 in FIG. 1) or a non-transitory computer-readable medium. In some embodiments, some aspects of the process 1800 may be implemented as hardware (e.g., a specific-purpose circuit). In some embodiments, the process 1800 may be implemented as a combination of software and hardware.

FIG. 18 includes process blocks 1801 to 1817. At block 1801, a processing means (e.g., the processing circuitry 110 in FIG. 1) may display multiple headings including a first heading and a second heading (e.g., first heading 401 and second heading 403 in FIG. 4).

At block 1803, the processing means may receive a first selection of a first cell associated with the first heading (e.g., "Person 1" cell 801 associated with "Person" heading 803 in FIG. 8). In some embodiments, the first cell may include a first category indicator.

At block 1805, the processing means may receive a second selection of a second cell associated with the first heading (e.g., "Person 2" cell 901 associated with "Person" heading 903 in FIG. 9). In some embodiments, the second cell may include a second category indicator.

In some embodiments, the processing means may generate a real time indicator of a number of received selections (e.g., "1 selected" indicator 801 in FIG. 8, representing the number of received selections of persons in the column associated with "Person" heading 803).

At block 1807, the processing means may receive a third selection of a third cell associated with the second heading (e.g., "Stuck" cell 1001 associated with "Status" heading 1003 in FIG. 10). In some embodiments, the third cell may include a third category indicator (e.g., a colored circle 1005, such as a red circle, in FIG. 10).

At block 1809, the processing means may generate a logical filter for the complex table (e.g., the logical filter illustrated by FIG. 11 or FIG. 12). At block 1811, generating a filter may involve joining with an "or," the first selection and the second selection associated with the first heading (e.g., the logical filter 1107 for a selection of "Person 1" cell 1101 and "Person 2" cell 1103 associated with "Person" heading 1105 in FIG. 11). In some embodiments, the first selection and the second selection may constitute a first group (e.g., first group 1203 for a selection of "Person 1" and "Person 2" cells in FIG. 12). At block 1813, generating a filter may involve joining with an "and," the third selection and the first group (e.g., the logical filter 1207 for a selection of "Stuck" cell 1201 associated with "Status" heading 1205 and first group 1203 in FIG. 12).

At block 1815, the processing means may apply the logical filter to the complex table (e.g., such as applying filter 501 in FIG. 5 to generate filtered complex table 600 in FIG. 6). In some embodiments, the processing means may apply the logical filter in real time to each selection, as previously discussed. In some embodiments, the processing means may cause the logical filter to be saved in memory for later application, consistent with the discussion above. In some embodiments, the processing means may cause the logical filter to be saved in a repository for application to a summary view of the complex table, as previously discussed.

At block 1817, the processing means may, in response to application of the logical filter, cause a display of a filtered collection of items from the first group that contain the third category indicator, consistent with the previous disclosure.

In some embodiments, the processing means may calculate and display a number of times that the first category indicator appears under the first heading as discussed above. In some embodiments, the processing means may reduce the displayed number of times following receipt of the third selection as discussed above. In some embodiments, the processing means causing a display of the filtered collection may include displaying metadata associated with at least one item of the collection consistent with the disclosure above.

Consistent with disclosed embodiments, systems, methods, and computer readable media for customizing chart generation based on table data selection are disclosed. Computerized systems and methods for customizing chart generation based on table data selection provide several benefits over extant processes that rely on manual processes for generating graphical representations. A user may desire, for example, to utilize automatic processes to generate graphical representations based on user selections of table data, without having to manually create graphical representations and without having to interact with a separate graphical user interface. In addition, the disclosed computerized systems and methods may generate a link between the table data and the graphical representation, thereby leading to real-time or near real-time updates of the graphical representation as a result of changes in the table data. This provides several benefits over extant processes that rely on manual updating or other user-dependent input to update graphical representations, resulting in saved time. Accordingly, some systems and methods disclosed herein may provide graphical representations containing up-to-date information automatically, allowing the user to gain access to table data faster and more reliably than with extant systems and methods.

The systems and methods described herein may be implemented with the aid of at least one processor or non-transitory computer readable medium, such as a CPU, FPGA, ASIC, or any other processing structure(s), as described above. A "chart" (which may also be referred to in some embodiments as a "graphical representation") may refer to an illustrative representation of data, which may be part of or associated with one or more dashboards, widgets, tables, or any other component of the system. Examples of charts include one or more bar charts, circle charts, pie charts, dashboards, widgets, maps, tables or tabulations, flowcharts, alphanumeric characters, symbols, pictures, a combination thereof, or any other visual or physical representation of data. Charts or graphical representations may be representative of data associated with a dashboard, widget, table, or any other component of the system, such as specific status values, projects, countries, persons, teams, progresses, or a combination thereof. It is to be understood that the present disclosure is not limited to any specific type of charts or graphical representations, but may rather be utilized in conjunction with any form or medium for representing data.

Figure 19:
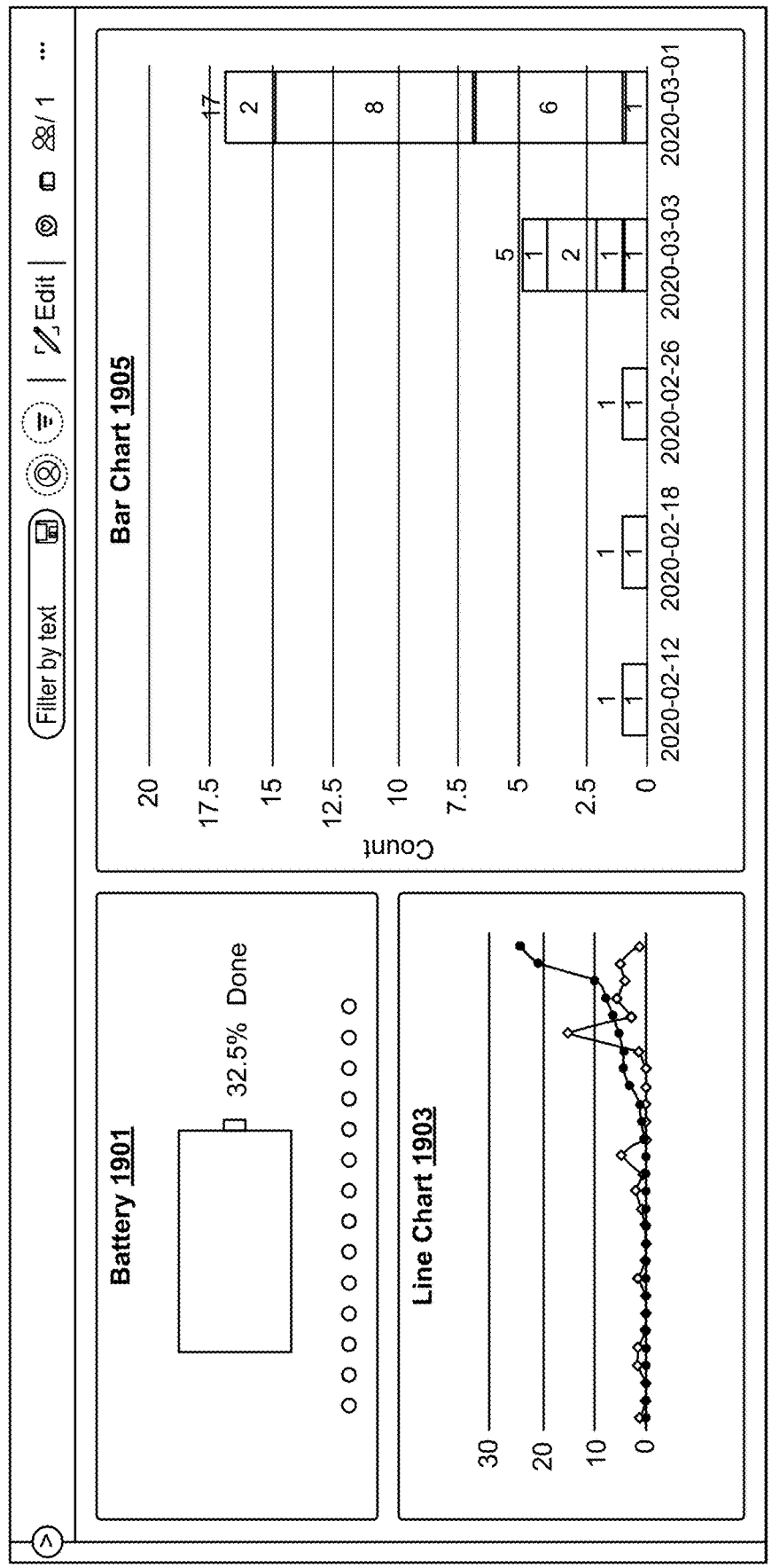
FIG. 19 illustrates exemplary charts and graphical representations, consistent with some embodiments of the present disclosure.

For example, FIG. 19 illustrates exemplary charts or graphical representations 1901, 1903, and 1905, consistent with embodiments of the present disclosure. In some embodiments, the charts or graphical representations 1901, 1903, and 1905 and other information discussed in connection with other figures may be displayed using a computing device (e.g., computing device 100 illustrated in FIG. 1) or software running thereon. The presentation may occur via a display associated with computing device 100 or one or more of the user devices 220-1 to 220-*m* in FIG. 2. As shown in FIG. 19, the charts or graphical representations may be contained within dashboard 1900. Dashboard 1900 includes a depiction of a battery chart 1901 that represents overall progress information of a task table (not shown), a line chart 1903 that represents information of planned progress versus actual progress extracted from the task table, and a bar chart 1905 that represents information of status by week extracted from the task table. Although dashboard 1900 is depicted as housing the charts or graphical representations 1901, 1903, and 1905 in FIG. 19, it is to be understood that charts or graphical representations may be presented in isolation, or partially or fully enclosed within other parts of the system, such as widgets, tables, other charts or graphical representation, or any other part of the system.

The battery chart 1901 shows a battery-shape representation that consolidates all of the statuses of the tasks included in the task table, such as "done," "in progress," "stuck," "waiting," "delayed," or any other status value in the task table. Also, the depiction of a battery chart 1901 includes the text "32.5% done" reflecting that 32.5% of the tasks associated with the statuses are "Done." That is, of all the tasks included in the associated underlying table, 32.5% are completed. This text may be a default or may be configured to present the percentage makeup or any of the status values in the task table.

The line chart 1903 shows two lines, a line of black dots and a line of circle dots. Each black dot of the line of black dots may represent a planned progress of a task included in the task table, and each circle dot of the line of circle dots may represent an actual progress of a task included in the task table. The line chart may be a default or may be configured according to user preference.

The bar chart 1905 shows five bars, each bar including one or more statuses included in one week (e.g., the week of "2020-02-12," the week of "2020-02-18," and so on). That is, each bar may represent all the statuses updated or changed within one week for their associated tasks. The bar chart may be a default or may be configured according to user preference.

Figure 20:
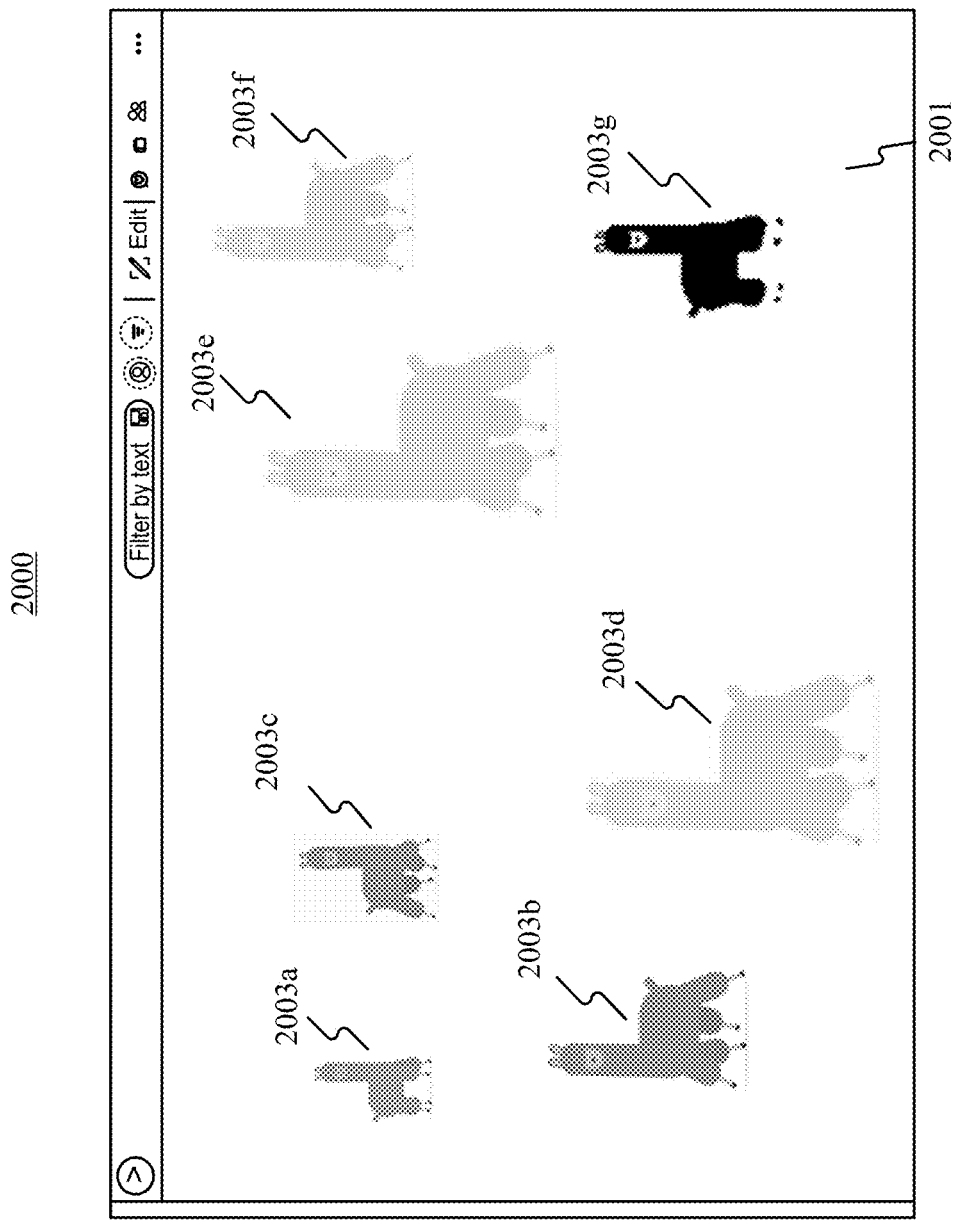
FIG. 20 illustrates another graphical representation, consistent with some embodiments of the present disclosure.

FIG. 20 illustrates another chart or graphical representation 2001, consistent with embodiments of the present disclosure. Chart or graphical representation 2001 may be contained within dashboard 2000 (as in FIG. 20), or it may be in isolation, or partially or fully contained within another part of the system (e.g., a widget, a table, or another graphical representation). As shown in FIG. 20, a graphical representation may consist of one or more depictions, in this case llamas (e.g., llama 2003*a*, 2003*b*, 2003*c*, 2003*d*, 2003*e*, 2003*f*, or 2003*g*). Llamas are illustrated by way of example only. Any depiction of an object may be used. Depictions of objects may be stored in a repository, and a user may be enabled to select a depiction most suitable to a user's interest. Alternatively, users might be permitted to upload their own depiction of objects, and the system processor may be configured to generate varying versions (differing in or more of size, color, visual texture, or any other visible characteristic). In another embodiment, the depiction of objects may be automatically selected based on a software package version or preselected template. For example, when employed in a real estate context, the objects may be buildings, and when employed in a transportation context the objects may be vehicles. The objects might also change within any particular platform depending on context. A manufacturer with five products might employ five different graphical objects to represent each separate product. In some embodiments, the position of each llama may change over time such as through one or more of horizontal, vertical, or diagonal movement or any other positional change, such that the position of one or more individual llamas may move to a different position (not shown) than their original positions in FIG. 20. Multiple different classes of objects might appear on a common display, or each form of display might be reserved for a particular object. Thus, object movement may include a change in orientation, location, movement along a path, position relative to other objects (e.g., on a screen). Object movement may also include an animation of the object (e.g., an avatar or animal with moving legs "walking" or a vehicle with wheels spinning), a change in animation, a change in color, or any other change relative to the object or the object's environment.

A chart may be generated through one or more signals, instructions, operations, or any method for rendering graphical representations of data. A chart may be generated using visual, tactile, or any other physical methods of rendering or displaying information. The generation process may be performed with the aid of the at least one processor or with the aid of a separate device. For this purpose, any suitable device may be used to generate a chart. For example, a chart may be generated through one or more mobile devices, desktops, laptops, tablets, LED display, augmented reality (AR) display, virtual reality (VR) display, or a combination thereof. Alternatively, a chart may be generated electronically through a virtual button, automatically in response to a condition being met, or any other electric or digital input. In some embodiments, a chart may be saved in a repository for future retrieval, consistent with disclosed embodiments. A repository may include a database to manage digital content, such as databases to add, edit, delete, search, access, import, export, or manage content.

The generation of the chart may be customized so as to alter one or more properties of the chart. The customization may be based on table data selection, as explained further below. For example, properties of a chart that may be altered may include the data represented by the chart, its structure or format, any alphanumeric information included in the chart (e.g., text associated with one or more elements in the chart, such as a heading or a label), colors associated with one or more elements in the chart (e.g., the color of a bar in a bar graph), or any other attribute or characteristic of the chart. In addition, a chart may be customized by adding or deleting elements, such as by adding or removing sections in a pie chart, portions of a table, figures or images, moving objects, or any other element of the chart.

Figure 21:
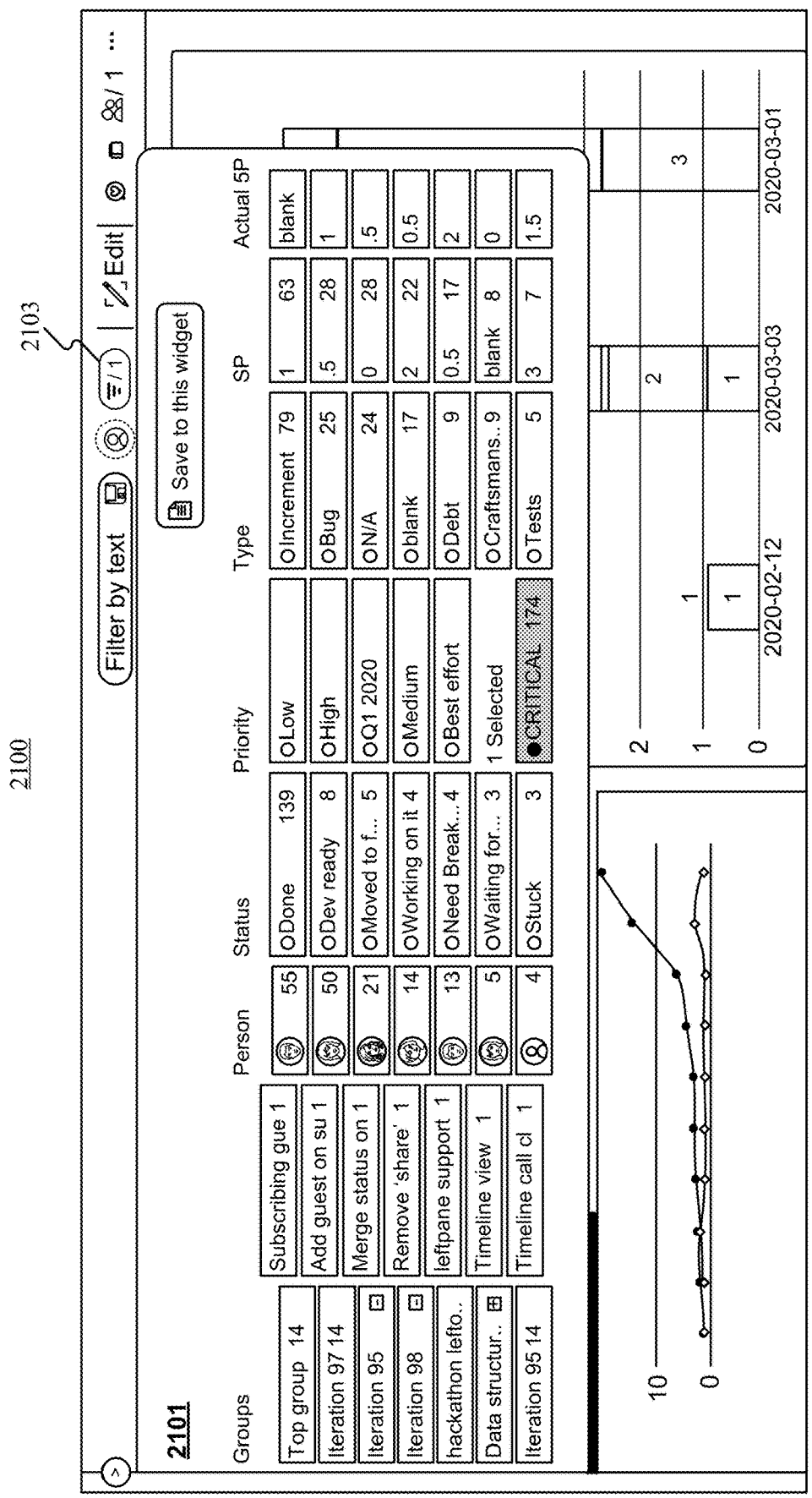
FIG. 21 illustrates an exemplary table for customizing charts and graphical representations, consistent with some embodiments of the present disclosure.
Figure 22:
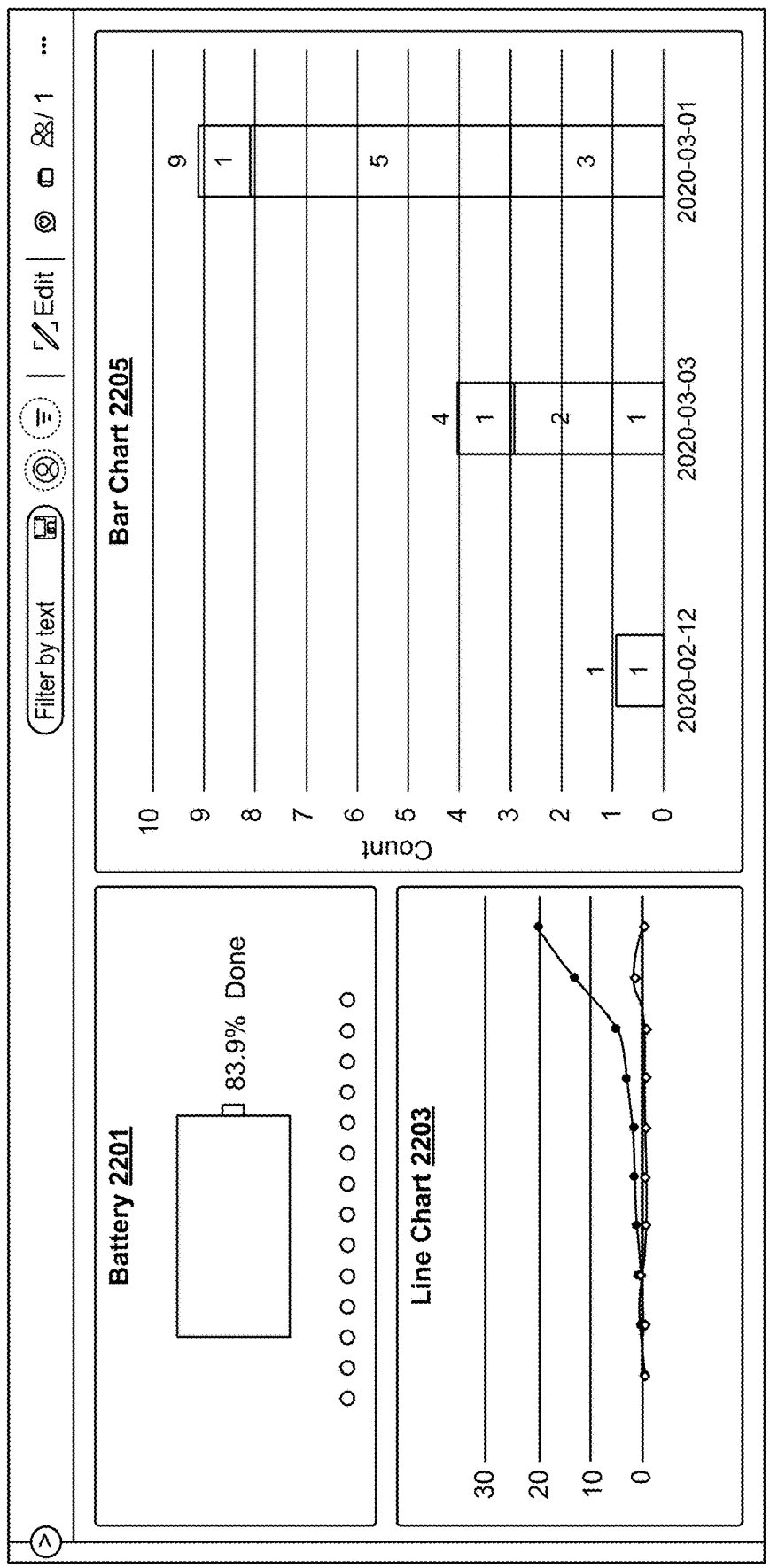
FIG. 22 illustrates an example of a customized chart and graphical representation, consistent with some embodiments of the present disclosure.

For example, FIG. 21 illustrates an exemplary table 2101 for customizing charts or graphical representations associated with dashboard 2100, consistent with embodiments of the present disclosure. In this example, dashboard 2100 may be the same as dashboard 1900 in FIG. 19. The dashboard 2100 in FIG. 21 may include an interactive element 2103 (e.g., a button). By selecting the interactive element 2103, as illustrated in FIG. 21, the at least one processor may cause to display another interactive element (e.g., a floating GUI element overlaying the dashboard 2100) showing the table 2101. The table 2101 may include multiple buttons, each button representing a feature or a characteristic (e.g., specific cell values) in the data associated with the charts or graphical representations in dashboard 2100. By selecting one or more of the buttons, the filter 2101 may activate the features or characteristics associated with the selected buttons for generating a filtered summary view. For example, by selecting a button "CRITICAL 174" (representing that 174 tasks having the status "CRITICAL") in the "Priority" column of the filter 2101, the at least one processor may customize the charts or graphical representations associated with dashboard 2100 to display only information for tasks having the status "CRITICAL." FIG. 22 illustrates an example of the resulting customized chart or graphical representation 2201, 2203, and 2203 contained in dashboard 2200, consistent with embodiments of the present disclosure.

The at least one processor may be configured to maintain at least one table containing rows, columns, and cells at intersections of rows and columns, consistent with disclosed embodiments. A table may refer to data presented in horizontal and vertical rows, (e.g., horizontal rows and vertical columns) defining cells in which data is presented, as described above. Columns intersecting with rows of items may together define cells in which data associated with each item may be maintained. Table data may refer to any information associated with cells, columns, rows, or any other data associated with the table. The table data may include data maintained in a specific table, mirrored or linked from a second table, metadata or hidden data, or any other data that may be associated with a table.

Figure 23:
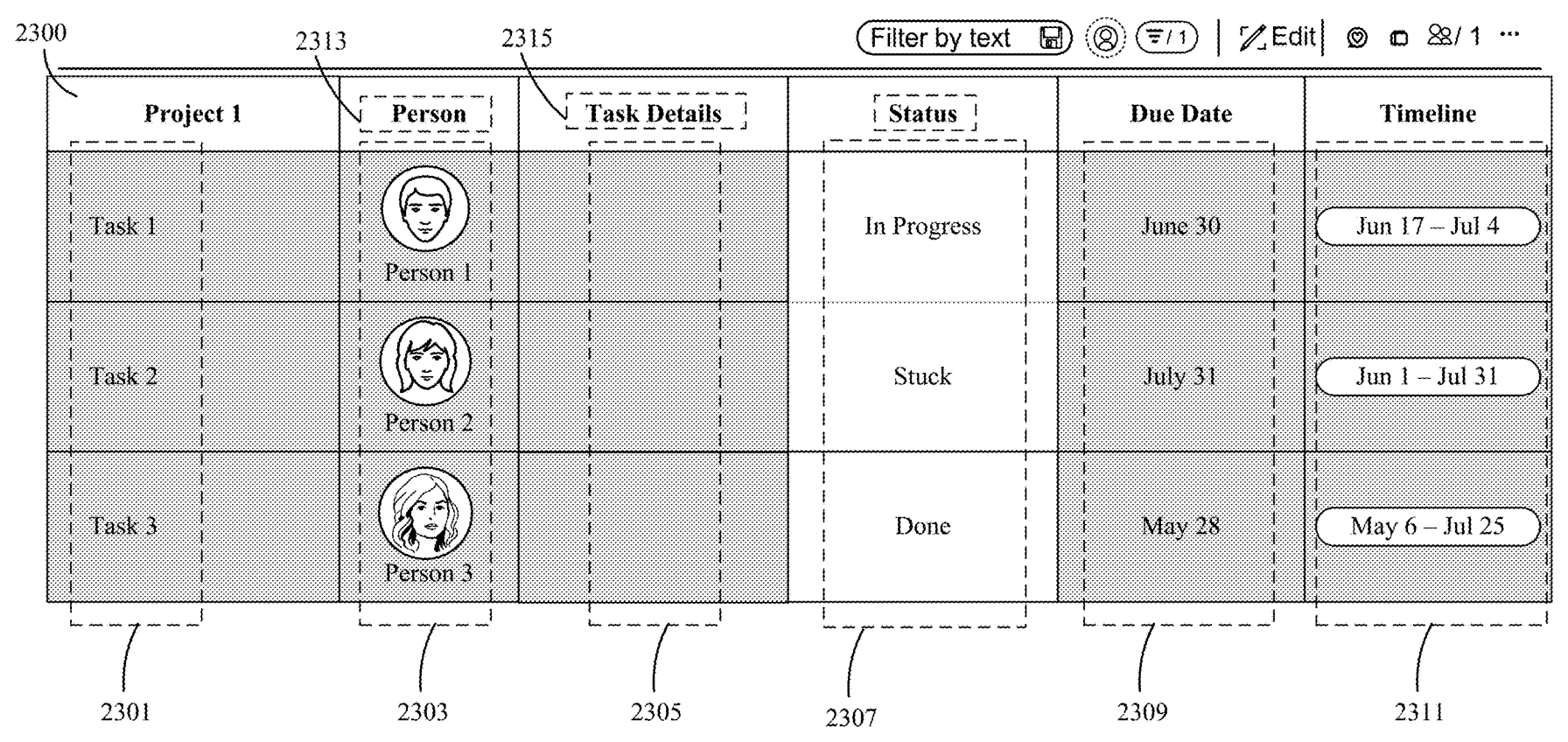

For example, FIG. 23 illustrates an exemplary table 2300 that may include multiple columns, rows, and cells, consistent with embodiments of the present disclosure. Table 2300 may be contained in a dashboard, widget, or any other component of the system. As shown in FIG. 23, the table 2300 may include a "Project" column 2301 associated with a project (i.e., "Project 1") for display and may include, in the multiple rows and columns, cells corresponding to tasks (e.g., in rows including "Task 1," Task 2," or "Task 3" in column 2301). The table 2300 may also include a "Person" column 2303 associated with cells corresponding to persons assigned to a task, a "Task Details" column 2305 associated with cells corresponding to additional information related to the task, a "Status" column 2307 associated with cells corresponding to the state of the task, a "Due Date" column 2309 associated with cells corresponding to a deadline of the task, and a "Timeline" column 2311 associated with cells corresponding with progress over time of the task, or any information, characteristic, or associated entity of the project. The table 2300 may include any number of columns and may include multiple columns with the same column heading with the same column type, or may include multiple columns with the same column heading with a different column type. For example, table 2300 may be altered to change "Person" heading 2313 to include the text "Task Details" identical to "Task Details" heading 2315 despite that person column 2303 is a different column type from task column 2305. It may be possible for a two columns of differing column types to have the same column heading and it may be possible for two columns of the same column type to have different column headings according to user preference.

As a further example, FIG. 21 illustrates an exemplary table 2101 that may be an interactive element overlaying dashboard 2100, consistent with embodiments of the present disclosure, as discussed in connection with FIG. 21. As can be appreciated from comparing FIG. 21 with FIG. 23, a table may be maintained within a dashboard, widget, or other component of the system (as in FIG. 23) or it may be dynamically generated as a result of one or more actions (e.g., pressing an interactive button) (as in FIG. 21) or both.

The at least one processor may be configured to receive a first selection of at least one cell in the at least one table, consistent with disclosed embodiments. A first selection may include any user action, such as a mouse click, a cursor hover, a mouseover, a button, a keyboard input, a voice command, an interaction performed in virtual or augmented reality, or any other action by a user received via the at least one processor. In embodiments where the at least one table includes horizontal rows and vertical columns, the at least one cell may be part of a column, a row, or both. The at least one cell is not limited to any particular column or row until a selection is made for the at least one cell.

For example, FIG. 24 illustrates an exemplary table 2400 where a first selection of at least one cell in table 2400 is received, consistent with disclosed embodiments. In FIG. 24, cell 2401 ("Person 1") associated with "Person" column 2403 is selected, for example, by a user interaction (e.g., a mouse click) with the at least one cell 2401. As shown in FIG. 24, the selection of the at least one cell 2401 may be indicated by a change in color, size, font, or any other attribute associated with the at least one cell as compared to non-selected cells.

The at least one processor may be configured to generate a graphical representation associated with the first selection of the at least one cell, consistent with disclosed embodiments. A graphical representation may refer to any visual illustration of data, such as one or more bar charts, circle charts, pie charts, dashboards, widgets, maps, tables or tabulations, flowcharts, alphanumeric characters, symbols, pictures, or a combination thereof, as described above. The graphical representation may be generated as a result of a command, such as the selection of at least one cell, through one or more signals, instructions, operations, or any method for directing the rendering of illustrations of data. In embodiments where the at least one table includes horizontal rows and vertical columns, the at least one cell may be part of a column, a row, or both. The at least one cell is not limited to any particular column or row until a selection is made for the at least one cell. In some embodiments, the graphical representation may include at least two visualizations and the at least one processor may be further configured to receive an input and to alter a presentation of at least one of the at least two visualizations in response to the input. Visualizations may refer to any visual representation or illustration of data, as previously discussed. Receiving an input may include the system receiving instructions via an interface (e.g., a mouse, keyboard, touchscreen, or any other interface) that may indicate an intent to make a selection for further action on the selected material. Receiving an input to alter a presentation of a visualization may include receiving instructions to select a part or an entire visualization that may result in any modification such as an addition, removal, rearrangement, or any other modification in the display of information associated with a visualization. For example, a graphical representation may include at least one widget (e.g., a visualization) for displaying data. Each widget may include a widget-based filter that can affect the specific graphical representation of that widget. The widget-based filter may receive a selection (e.g., the input) that could supersede a previous dashboard-based filter (e.g., from a first selection as previously discussed above), such as by adding data that was previously filtered out by a dashboard level filter. In this scenario, the input may result in an addition of data to a graphical representation of that particular widget that was selected. In other instances, the widget-based filter may receive a selection that was not filtered out previously by a dashboard level filter, which may result in the removal of some data from the graphical representation of that particular widget, resulting in an additional drill down of the data in that widget. In response to receiving an input associated with a visualization, the system may also combine the input to add a widget-based filter to work in conjunction with a dashboard filter. In another example, the received input may result in a removal of data from a widget (e.g., a visualization). In another instance, in response to receiving an input for a visualization, the system may add data that was not previously shown in the visualization. For example, a dashboard (e.g., a graphical representation) may include one or more widgets (e.g., visualizations) that may receive a first selection to filter information contained in all of the widgets to only display "Done" and "Stuck" tasks. An input may be received on a specific widget (e.g., a visualization depicting a battery) to also present information relating to tasks associated with a "Working on it" status. In this scenario, while the other widgets may only display "Done" and "Stuck" tasks, the specific widget (e.g., the at least one visualization) may display all "Done," "Stuck," and "Working on it" statuses.

For example, FIG. 25 illustrates an exemplary table 2500 where a first selection of at least one other cell in table 2500 is received, consistent with disclosed embodiments. Table 2500 in FIG. 25 may be the same as table 2400 in FIG. 24. In FIG. 25, an at least one cell 2501 ("Stuck") associated with "Status" column 2503 is selected, for example, by a user interaction (e.g., a mouse click) with the at least one cell 2501. As shown in FIG. 25, the selection of the at least one cell 2501 may be indicated by a change in color, size, font, or any other attribute associated with the at least one other cell as compared to non-selected cells.

Figure 26:
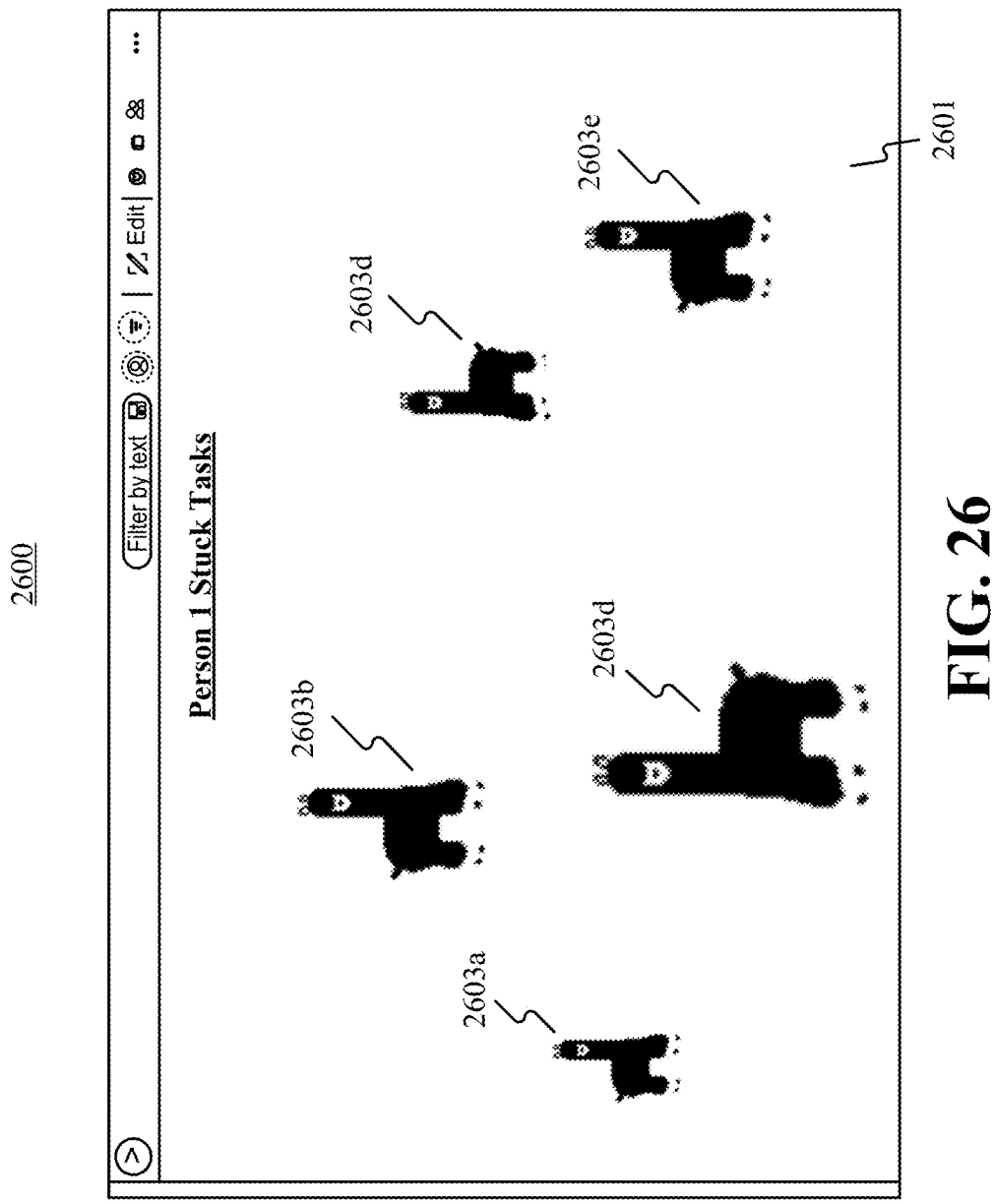
FIG. 26 illustrates a graphical representation associated with a cell selection, consistent with some embodiments of the present disclosure.

FIG. 26 illustrates a graphical representation 2601 associated with the first selection of at least one other cell, consistent with disclosed embodiments. The graphical representation 2601 may be contained partially or fully within a dashboard 2600 (as in FIG. 26) or other component of the system, or may be in isolation. As shown in FIG. 26, a graphical representation may consist of one or more depictions, in this case llamas (e.g., llama 2603a, 2603b, 2603c, 2603d, or 2603e). Llamas are illustrated by way of example only. Any depiction of an object may be used, as discussed above. The depictions may correspond to information associated with the first selection of the at least one cell. As illustrated in FIG. 26, for example, each llama may represent one of the five tasks resulting from the selection of the at least one cell 2501 ("Stuck") associated with "Status" column 2503 of table 2500 discussed above in connection with FIG. 25. As a result of a user interaction (e.g., mouse click or hover), additional information associated with each of the five tasks may be presented to the user (not shown).

The at least one processor may be configured to generate a first selection-dependent link between the at least one table and the graphical representation, consistent with disclosed embodiments. A first selection-dependent link may be generated as one or more instructions, signals, logic tables, logical rules, logical combination rule, logical templates, or any operations suitable such that when information associated with the first selection is updated in the at least one table, the graphical representation changes via the link. Additionally or alternatively, the first selection-dependent link may be associated with two or more graphical representations at once, such as those stored in or associated with a repository, dashboard, widget, database, in local memory on a user device, in a local network, or in any other electrical medium. For example, a selection-dependent link may be associated with all graphical representations in a dashboard, such as one or more pie charts, bar charts, or widgets in the dashboard. In this manner, when the information associated with the first selection is updated in the at least one table, the graphical representations in the dashboard change accordingly, leading to a consistent display of information, saved time, and a more enjoyable user experience.

Figure 27:
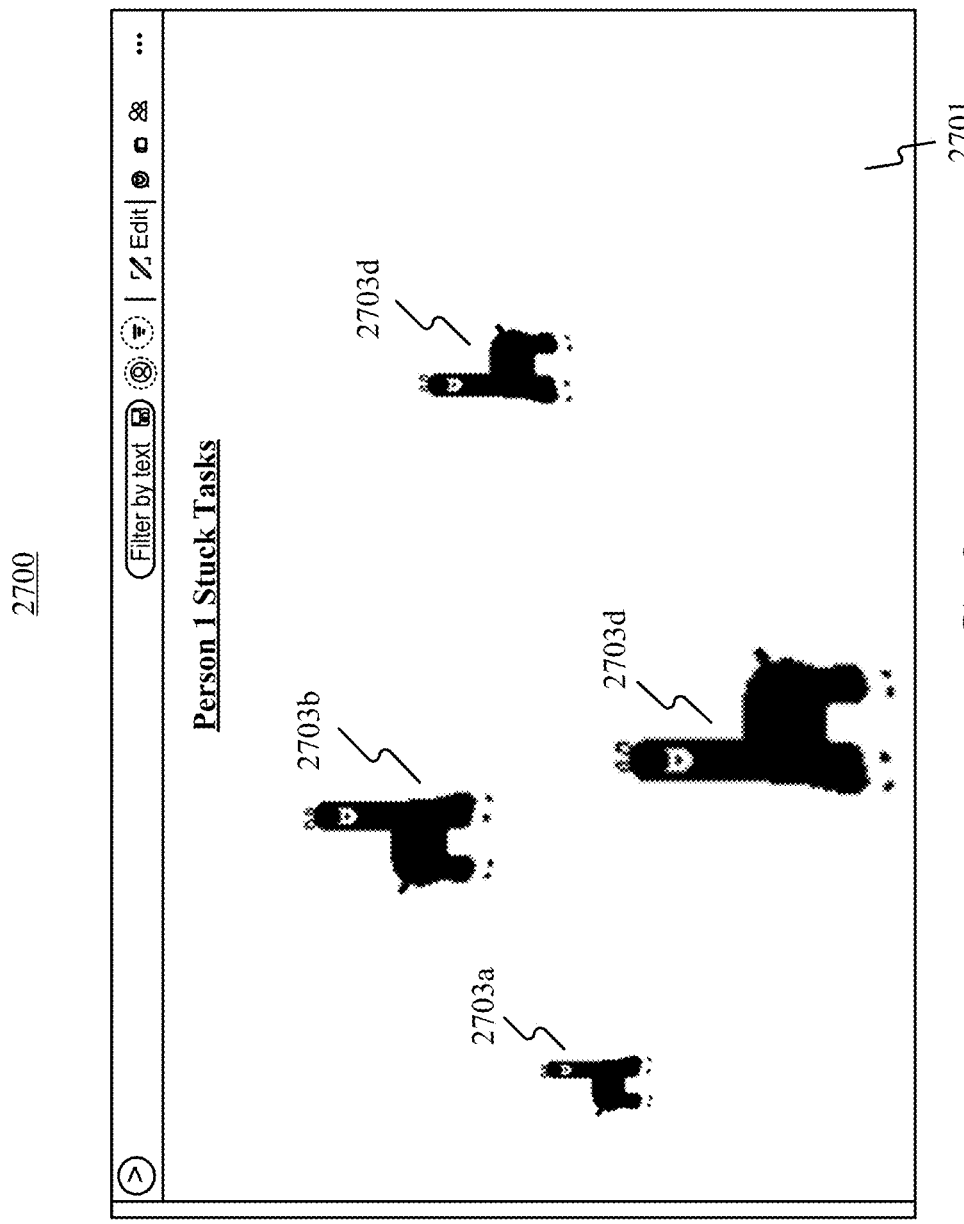
FIG. 27 illustrates an example of a graphical representation changed in response to an update of information in a cell, consistent with some embodiments of the present disclosure.

For example, FIG. 27 illustrates an exemplary graphical representation 2701 that changed when information associated with the first selection was updated, consistent with disclosed embodiments. Dashboard 2700 in FIG. 27 may be an update to dashboard 2600 in FIG. 26. A depiction associated with a task (e.g., a llama) may be deleted, added, modified, or otherwise changed in response to a change in the underlying task. As shown in FIG. 27, for example, as a result of a first selection-dependent link, a llama corresponding to a task (e.g., llama 2703e in FIG. 26) may be removed when the task is no longer associated with the first selection, such as when a person associated with the task (e.g., "Person 1") is no longer associated with the task, the person has completed the task, the task no longer has a "Stuck" status, or for any other reason such that the task no longer meets the criteria corresponding to the first selection. Other forms of updates, however, may result in changes in the graphical representation, such as addition, deletion, modification, duplication, reduction, or other alterations in data.

In some embodiments, the first selection-dependent link may be tied to a column in the at least one table, consistent with disclosed embodiments. The first selection-dependent link may be associated with any information, features, or characteristics associated with a column in the at least one table, such as specific status values, projects, countries, persons, teams, progresses, or a combination thereof. Accordingly, as a result of a first selection of at least one cell, the graphical representation associated with the first selection-dependent link may be updated to include a specific information, feature, or characteristic in the column associated with the at least one cell, thereby providing additional relevant information to the user. For example, upon selecting a cell associated with a specific person associated with a task, the graphical representation may be updated to reflect information associated with all persons. In addition, in some embodiments the first selection-dependent link may be tied to one or more columns, one or more rows, or both.

Figure 28:
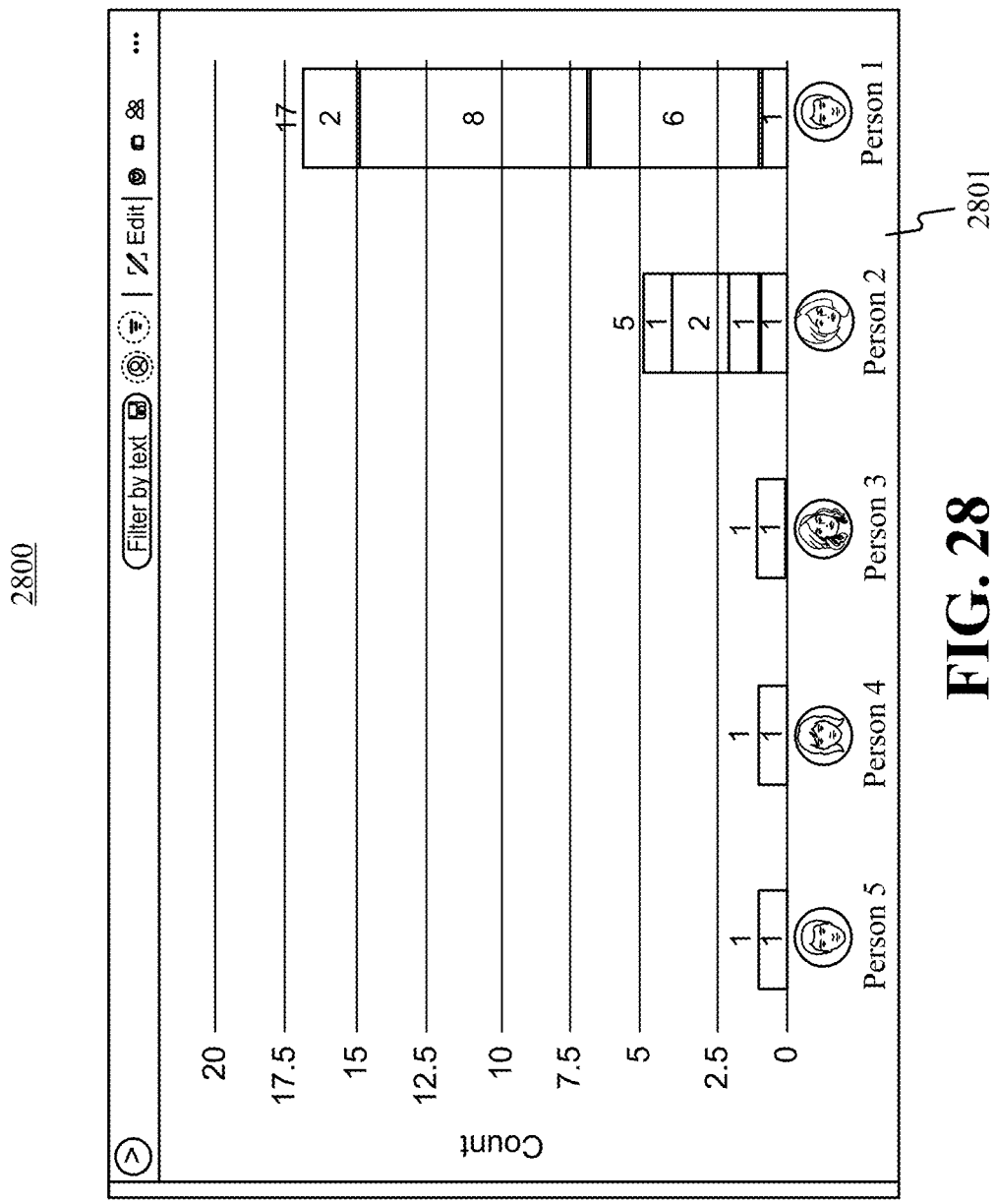
FIG. 28 illustrates an exemplary graphical representation where a first selection-dependent link may be tied to a column in a table, consistent with some embodiments of the present disclosure.

For example, FIG. 28 illustrates an exemplary graphical representation 2801 where the first selection-dependent link may be tied to a column in a table associated with dashboard 2800, consistent with disclosed embodiments. Graphical representation 2801 in FIG. 28 may be generated as a result of a first selection of at least one cell 2401 ("Person 1") in FIG. 24 and at least one cell 2501 ("Stuck") in FIG. 25. In other embodiments, the graphical representation 2801 may also have been generated as a result of a first selection of at least one cell 2313 (e.g., a person column heading in FIG. 23). As shown in FIG. 28, graphical representation 2801 may be associated with a column, such as the persons column corresponding to a selection of "Person 1" cell. Consequently, graphical representation 2801 may include information associated with persons other than Person 1, such as Person 2, Person 3, Person 4, and Person 5.

The at least one processor may be configured to receive a second selection of at least one cell in the at least one table, consistent with disclosed embodiments. The second selection may be received in the same or similar manner as the first selection as described above (e.g., through any user action, such as a mouse click, a cursor hover, a mouseover, a button, a keyboard input, a voice command, an interaction performed in virtual or augmented reality, or any other action by a user received via the at least one processor). The second selection may be received in a manner that modifies the first selection as previously discussed above. In some embodiments, the second selection may be received in a manner different from the first selection (e.g., the first selection is made on a table, and the second selection is made on a graphical representation).

For example, FIG. 29A illustrates an exemplary table 2900a where a second selection of at least one cell in table 2900a is received, consistent with disclosed embodiments. Table 2900a in FIG. 29A may be updated versions of table 2400 in FIG. 24 or table 2500 in FIG. 25. In FIG. 29A, an at least one cell 2901a ("Person 2") associated with "Person" column 2903a is selected, for example, by a user interaction (e.g., a mouse click) with the at least one cell 2901a. As shown in FIG. 29A, the selection of the at least one cell 2901a may be indicated by a change in color, size, font, or any other attribute associated with the at least one cell as compared to non-selected cells.

In some embodiments, the second selection of the at least one cell in the at least one table may be received as a result of an indirect selection of the at least one cell. For example, a user may perform an interaction (e.g., a mouse click) with a depiction (e.g., a llama) in a graphical representation associated with a table, as described herein. As a result of the user interaction with the depiction, a cell associated with the depiction may be selected. In this manner, the user may intuitively and efficiently select information on the table without being required to select information directly from the table. In some embodiments, the first selection of at least one cell, the second selection of at least one cell, or both, may be performed in the same or similar manner.

Figure 29B:
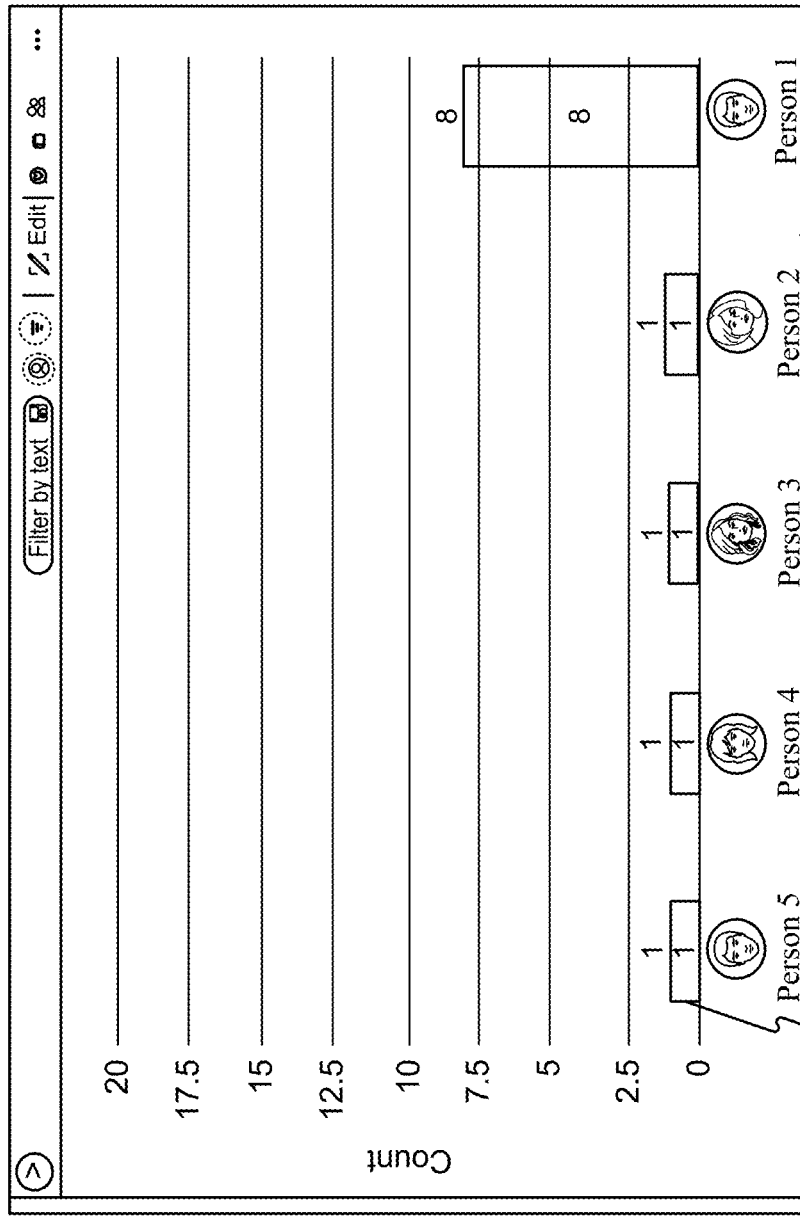

For example, FIG. 29B illustrates an exemplary graphical representation 2901b where a second selection of at least one cell in a table is received, consistent with disclosed embodiments. Dashboard 2900b in FIG. 29B may be an updated version of dashboard 2800 in FIG. 28. In FIG. 29B, depiction 2903a (e.g., a segment in a bar chart) associated with "Person 5" may be subject to a user interaction (e.g., a mouse click). As a result of the user interaction with depiction 2903a, an at least one cell in a table corresponding to depiction 2903a may be selected (e.g., a cell associated with Person 5 with a status of "Done"). As shown in FIG. 29B, the second selection of the at least one cell in the table may be indicated by altering graphical representation 2901b, such as by only displaying depictions with the same or similar information as that of the at least one cell, such as gray ("Done") bar segments for "Person 1," "Person 2," "Person 3," "Person 4," and "Person 5."

The at least one processor may be configured to alter the graphical representation based on the second selection, consistent with disclosed embodiments. An alteration of the graphical representation may include a recalculation of data, the addition of data, the subtraction of data, a rearrangement of information, modifying the appearance of one or more visible items (e.g., table border, font type, font size, layout, arrangement of columns or rows), or any other modification of information displayed, presented, or associated with the graphical representation.

Figure 30A:
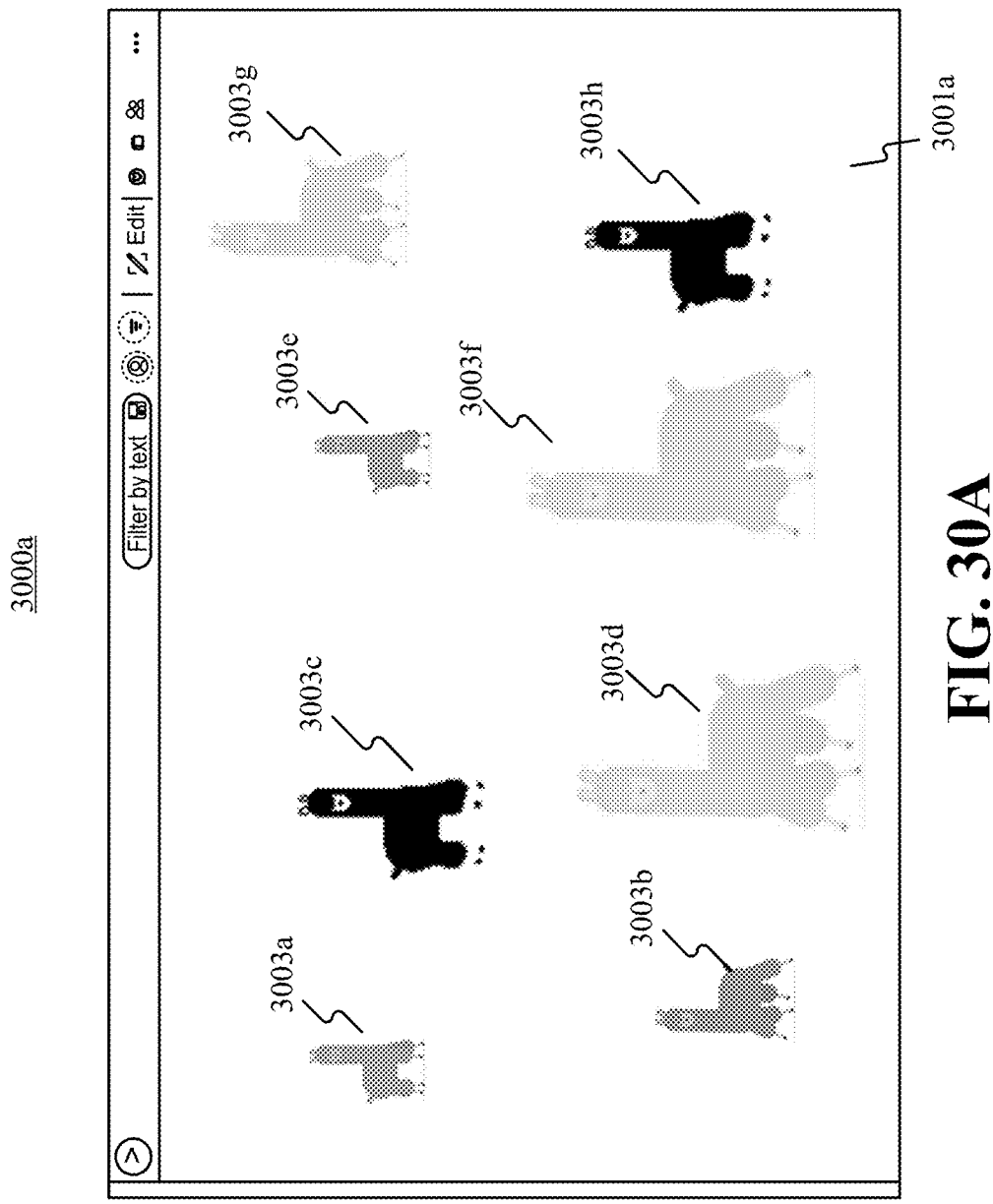
FIGS. 30A and 30B illustrate exemplary graphical representations associated with another selection of at least one cell, consistent with some embodiments of the present disclosure.

For example, FIG. 30A illustrates a graphical representation 3001a associated with the second selection of at least one cell, consistent with disclosed embodiments. Dashboard 3000a in FIG. 30A may be the same as dashboard 2600 in FIG. 26. As shown in FIG. 30A, a graphical representation may consist of one or more depictions, in this case llamas (e.g., llama 3003a, 3003b, 3003c, 3003d, 3003e, 3003f, 3003g, or 3003h). Llamas are illustrated by way of example only. Any depiction of an object may be used, as discussed above. The depictions may correspond to information associated with the second selection of at least one cell. As illustrated in FIG. 30A, for example, each llama may represent one of the eight tasks with a "Stuck" status associated with either Person 1 (e.g., as a result of selection of "Person 1" cell 2401 discussed in connection with FIG. 24) or Person 2 (e.g., as a result of selection of "Person 2" cell 2901 discussed in connection with FIG. 29A). Comparing graphical representation 3001 in FIG. 30A with graphical representation 2601 in FIG. 26, it can be seen that three new depictions corresponding to tasks associated with Person 2 are present in graphical representation 3001a in FIG. 30A. However, other methods of illustrating information associated with a second selection may be used, such as through alphanumeric characters, videos, images, VR or AR objects, or any other representation of data. As a result of a user interaction (e.g., mouse click or hover), additional information associated with each of the eight tasks may be presented to the user (not shown).

In some embodiments, the graphical representation may be altered as a result of a second selection performed from the graphical representation or a different graphical representation. For example, a user may perform an interaction (e.g., a mouse click) with a depiction (e.g., a llama) in a graphical representation associated with a table, resulting in the selection of least one cell in the table associated with the depiction, as described above. As a result of the user interaction with the depiction, the graphical representation may be altered to display information associated with the at least one cell associated with the depiction. In this manner, the user may intuitively and efficiently modify graphical representations without being required to select information directly from the table. In some embodiments, one or more additional graphical representations may be generated or altered as a result of the interaction with the depiction.

Figure 30B:
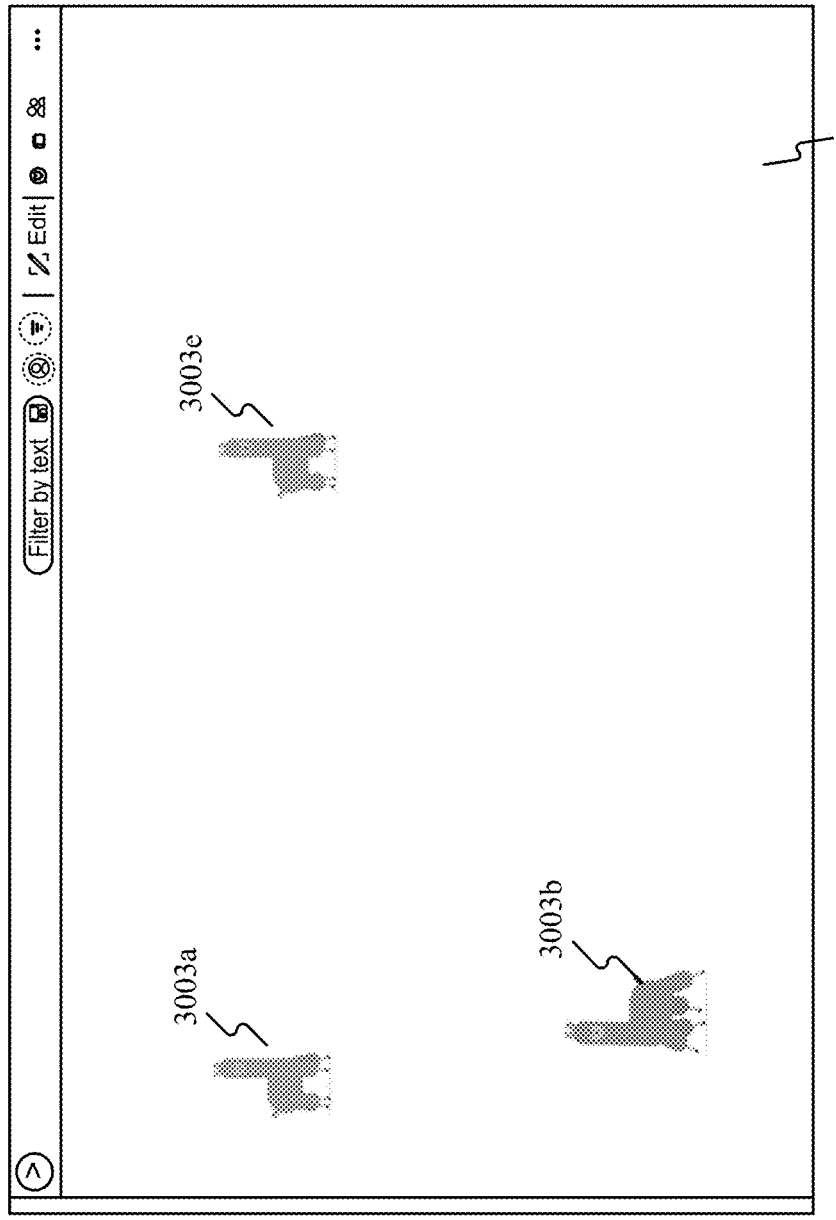

For example, FIG. 30B illustrates a graphical representation 3001b altered as a result of a second selection performed within the graphical representation, consistent with disclosed embodiments. Dashboard 3000b in FIG. 30B may be the same as dashboard 3000a in FIG. 30A. Graphical representation 3001a in FIG. 30A may be altered as a result of a user interaction (e.g., a mouse click) with a depiction, such as llama 3003a. As a result of the user interaction, graphical representation 3001a may be modified to display only information associated with llama 3003a, as can be seen from comparing graphical representation 3001a in FIG. 30A with graphical representation 3001b in FIG. 30B. In FIG. 30B, graphical representation 3001b may include only depictions associated with the second selection, that is gray llamas associated with the status "Done" (e.g., llamas 3003a, 3003b, and 3003e). However, other methods of illustrating information associated with a second selection may be used (e.g., alphanumeric characters, videos, images, VR or AR objects, or any other representation of data) as discussed above. In addition, other graphical representations may be generated or altered as a result of the user interaction with llama 3003a in FIG. 30A (not shown).

The at least one processor may be configured to generate a second selection-dependent link between the at least one table and the graphical representation, consistent with disclosed embodiments. A second selection-dependent link may be generated in the same or similar manner as the first selection-dependent link as described above (e.g., as one or more instructions, signals, logic tables, logical rules, logical combination rules, logical templates, or any operations suitable such that when information associated with the second selection is updated in the at least one table, the graphical representation changes). Additionally or alternatively, a second selection-dependent link may be associated with two or more graphical representations at once, such as those stored in or associated with a repository, dashboard, widget, database, in local memory on a user device, in a local network, or in any other electrical medium, as described above in connection with the first selection-dependent link. In some embodiments, the second selection-dependent link may be associated with any information, features, or characteristics associated with one or more columns, one or more rows, or both, in the at least one table, such as specific status values, projects, countries, persons, teams, progresses, or a combination thereof.

Figure 31:
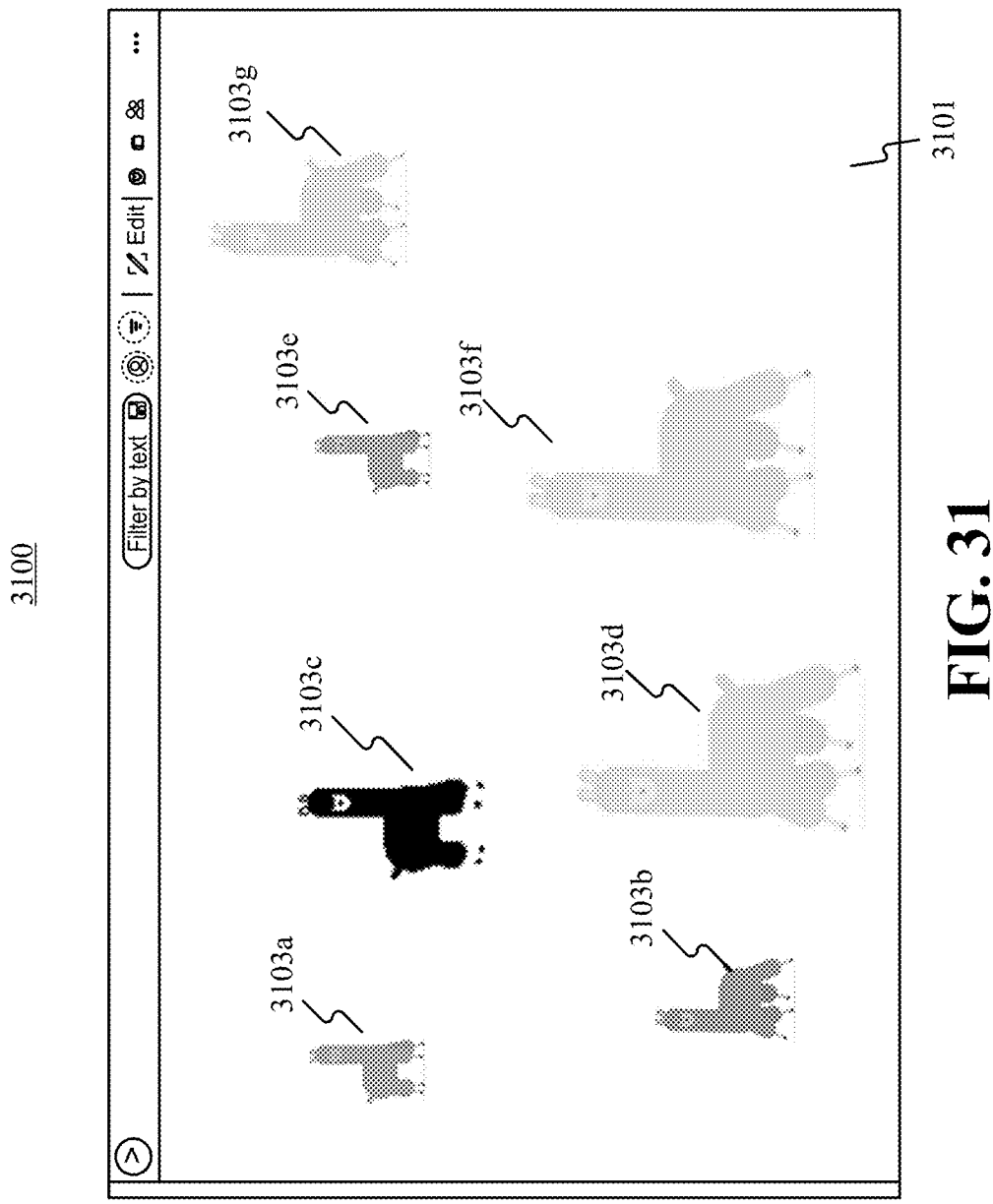
FIG. 31 illustrates an exemplary graphical representation that has changed when information associated with a selection is updated, consistent with some embodiments of the present disclosure.

For example, FIG. 31 illustrates an exemplary graphical representation 3101 that changed when information associated with the second selection was updated, consistent with disclosed embodiments. Dashboard 3100 in FIG. 31 may be an updated version of dashboard 3000a in FIG. 30A. A depiction associated with a task (e.g., a llama) may be deleted, added, modified, or otherwise changed in response to a change in the underlying task. As shown in FIG. 31, for example, as a result of a second selection-dependent link, a llama corresponding to a task (e.g., llama 3003h in FIG. 30A) may be removed when the task is no longer associated with the second selection, such as when a person associated with the task (e.g., "Person 2") is no longer associated with the task, the person has completed the task, the task no longer has a "Stuck" status, or for any other reason such that the task no longer meets the criteria corresponding to the second selection. Other forms of updates, however, may result in changes in the graphical representation, such as addition, deletion, modification, duplication, reduction, or other alterations in data.

In some embodiments, a graphical representation may be changed as a result of a second selection-dependent link due to a second selection performed from within the graphical representation or a different graphical representation. For example, one or more depictions (e.g., llamas) may be added, deleted, or modified in a graphical representation when the underlying table changes.

For example, graphical representation 3001b in FIG. 30B may be modified as a result of a second selection-dependent link due to a second selection of llama 3003a described above. When a task associated with a depiction, such as llama 3003e, is no longer associated with the second selection, then the depiction may be deleted. Other modifications may be performed, depending on the change in the underlying table, as described above.

The at least one processor may be configured to cancel the first selection in response to the second selection, consistent with disclosed embodiments. "Cancel" and variations thereof may refer to processes or procedures of removing, deleting, destroying, erasing, nullifying, negating, or any manner of neutralizing the effect of a selection. For example, a first selection of a first person may result in a graphical representation (e.g., a pie chart, bar chart, or widget) showing information associated with the first person. Subsequently, a second selection of a second person may result in the graphical representation no longer showing information associated with the first person, but rather only information associated with the second person.

For example, FIG. 32 illustrates an exemplary table 3200 where a first selection has been cancelled in response to a second selection, consistent with disclosed embodiments. Table 3200 in FIG. 32 may be the same as table 2500 in FIG. 25. In FIG. 32, a second selection of at least one cell 3201 ("Person 2") associated with "Person" column 3203 is selected, for example, by a user interaction (e.g., a mouse click) with the at least one cell 3201. As shown in FIG. 32, the selection of the at least one cell 3201 may result in the cancellation of a first selection of at least one cell 3205 ("Person 1"). As compared to the at least one cell "Peron 1" in FIG. 25, the at least one cell 3205 in FIG. 32 can be seen to revert back to its original state, which may be indicated by a change in color, size, font, or any other attribute associated with the at least one cell as compared to selected cells. While the cancellation of the first selection in FIG. 32 is partial (i.e., only cancelling the selection of "Person 1" cell), other forms of cancellations may be implemented, such as a full cancellation (i.e., also cancelling the selection of "Stuck" cell), a temporary cancellation, a random cancellation, or any other suitable process to determine the cancellation of a selection.

The at least one processor may be configured to receive a cancellation of the second selection, consistent with disclosed embodiments. A cancellation of the second selection may be received through any user action, such as a mouse click, a cursor hover, a mouseover, a button, a keyboard input, a voice command, an interaction performed in virtual or augmented reality, or any other action by a user received via the at least one processor. Following the cancellation receipt, the first selection may be revived. In this context, "revived" and variations thereof may refer to processes or procedures of re-rendering, adding, reconstructing, restoring, or any manner of recovering the effect of a previous selection.

For example, as a result of a cancellation receipt of a second selection of at least one cell 2901*a* ("Person 2") discussed in connection with FIG. 29A (e.g., through a mouse click, hover, or any other user interaction), table 2900*a* in FIG. 29A may revert back to table 2500 in FIG. 25, corresponding to the first selection.

As a further example, as a result of a user interaction with depiction 2901*b* (gray "Done" segment for "Person 5") discussed in connection with FIG. 29B (e.g., through a mouse click, hover, or any other user interaction), the second selection associated with depiction 2901*b* may be cancelled in the underlying table. Accordingly, graphical representation 2900*b* in FIG. 29B may revert back to graphical representation 2801 in FIG. 28.

The at least one processor may be configured, upon revival of the first selection, to revert the graphical representation to a prior state, consistent with disclosed embodiments. The graphical representation may revert back to a prior state by returning to a previous condition, period, or content, such as to represent information associated with a previous set of circumstances. For example, continuing the example above, a receipt of a cancellation of the second selection of the second person may result in the graphical representation no longer showing information associated with the second person, but rather may be restored to show the information associated with the first person.

For example, upon revival of the first selection of at least one cell "Person 1" and at least one cell "Stuck" as depicted in table 2500 in FIG. 25, graphical representation 3001*a* in FIG. 30A, showing "Stuck" tasks illustrated as llamas for both Person 1 and Person 2, may revert back to graphical representation 2601 in FIG. 26, showing "Stuck" tasks illustrated as llamas only for Person 1.

As a further example, following a cancellation receipt of a second selection associated with a user interaction with depiction 2901*b* (gray "Done" segment for "Person 5"), discussed in connection with FIG. 29B above, a revival of the underlying first selection may occur. As a result, graphical representation 2900*b* in FIG. 29B may revert back to graphical representation 2801 in FIG. 28 as noted above.

The at least one processor may be configured to, in response to receiving a request, generate another graphical representation based on the first and second selection-dependent links between the at least one table and the graphical representation, consistent with disclosed embodiments. A "request" may be one or more signals, instructions, operations, or any mechanism for directing a command received by the processor, such as from a second processor, a device, a network, as a result of an inquiry by the at least one processor, as a result of one or more user actions as described above (e.g., mouse click, keyboard input, voice command, or any other action received by the at least one processor), or any other information received by the at least one processor. Consistent with the definition above, the another graphical representation may refer to any visual illustration of data, such as one or more bar charts, circle charts, pie charts, dashboards, widgets, maps, tables or tabulations, flowcharts, alphanumeric characters, symbols, pictures, or a combination thereof. The another graphical representation may be generated as a result of a command, such as a cancellation receipt of the second selection, through one or more signals, instructions, operations, or any method for directing the rendering of illustrations of data. The another graphical representation may be different than the graphical representation described above, or it may be the completely or partially contained within the graphical representation, or both. It may contain any characteristic, feature, or information based on the first and second selection-dependent links between the at least one table and the graphical representation. For example, upon a receipt of a cancellation of the second selection, if the graphical representation is a pie chart, the at least one processor may cause an another graphical representation to be displayed in the form of a battery chart representing the same or similar information displayed by the pie chart based on the first and second selection-dependent links between the at least one table and the graphical representation (e.g., the selection of a person). In this manner, the user may selectively receive alternative representations of information.

Figure 33:
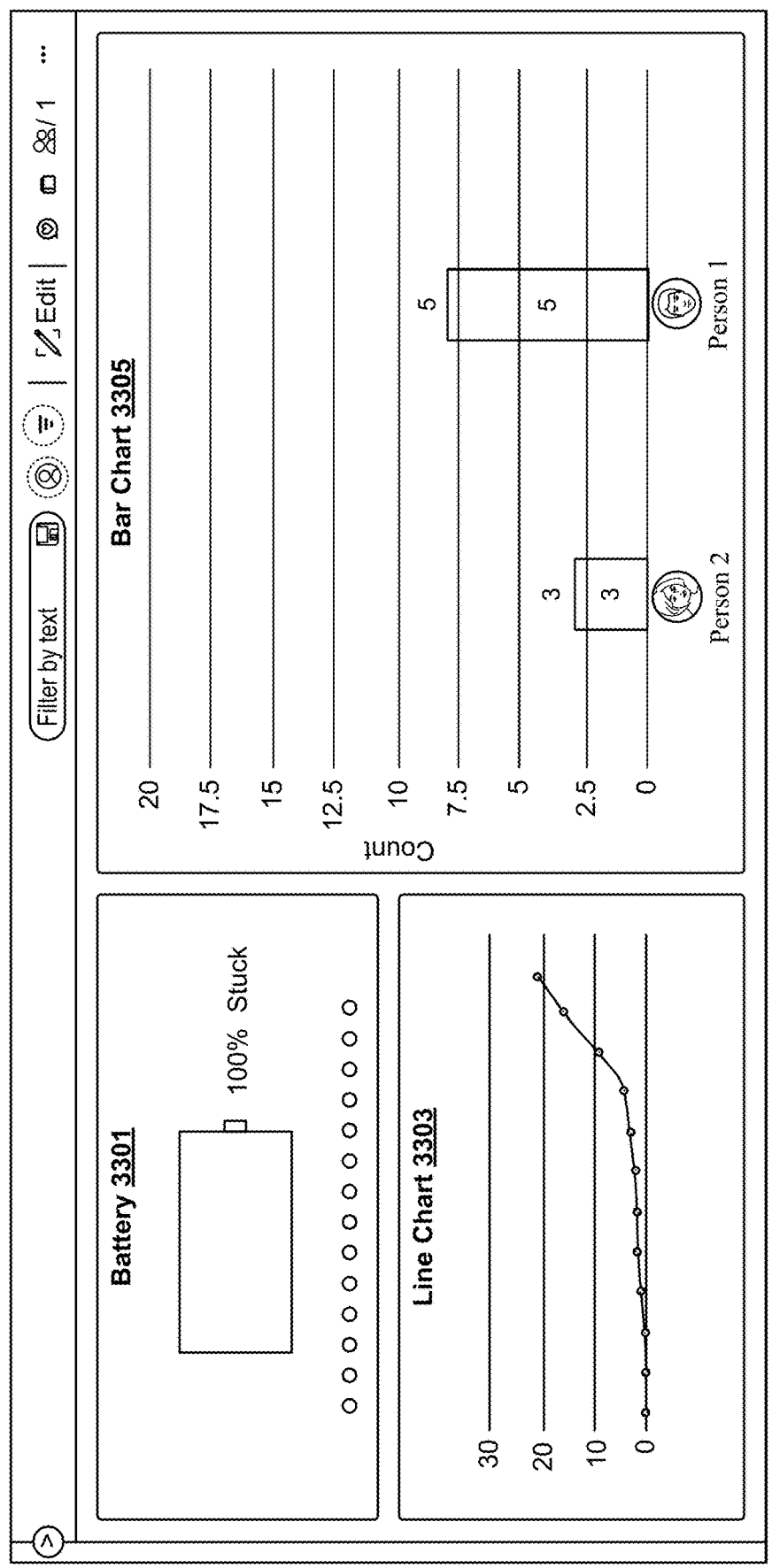
FIG. 33 illustrates another graphical representation based on first and second selection-dependent links generated upon receipt of a request, consistent with some embodiments of the present disclosure.

For example, FIG. 33 illustrates another graphical representation based on the first and second selection-dependent links generated upon receipt of a request, consistent with disclosed embodiments. As shown in FIG. 33, graphical representations other than graphical representations discussed in connection with other figures (e.g., 3001*a* in FIG. 30A) may be displayed. For example, battery graph 3301, line chart 3303, or bar chart 3305 in FIG. 33 may be generated as a result of a request. A request may be received as a result of a user action (e.g., mouse click or hover) as described above. Comparing FIG. 33 with FIG. 19, it can be seen that the graphical representations in FIG. 33 include only information associated with "Stuck" tasks associated with Person 1 and Person 2. As a result of the first and second selection-dependent links, any changes in the underlying table with respect to any "Stuck" tasks associated with Person 1 and Person 2 (e.g., additions or deletions) may result in alterations to the graphical representations 3301, 3303, and/or 3305 (not shown).

Consistent with disclosed embodiments, the at least one processor may be configured to receive a cancellation of the second selection, and following the cancellation receipt, revive the first selection to regenerate both the graphical representation and the another graphical representation. The cancellation of the second selection may be received in the same or similar manner as described above. The first selection may be revived in the same or similar manner as described above. In this context, "regenerate" may refer to processes or procedures of re-rendering, adding, reconstructing, restoring, or any manner of recovering any illustration, data, or information associated with the graphical representation, the another graphical representation, or both.

For example, continuing the example above, upon a receipt of a cancellation of the second selection, the at least one processor may cause the pie chart (i.e., the graphical representation) and the battery chart (i.e., the another graphical representation) to display the information associated with the selection of the first person (i.e., the first selection). In this manner, the user may be presented with multiple representations of information consistent with the user's previous selections.

Figure 34:
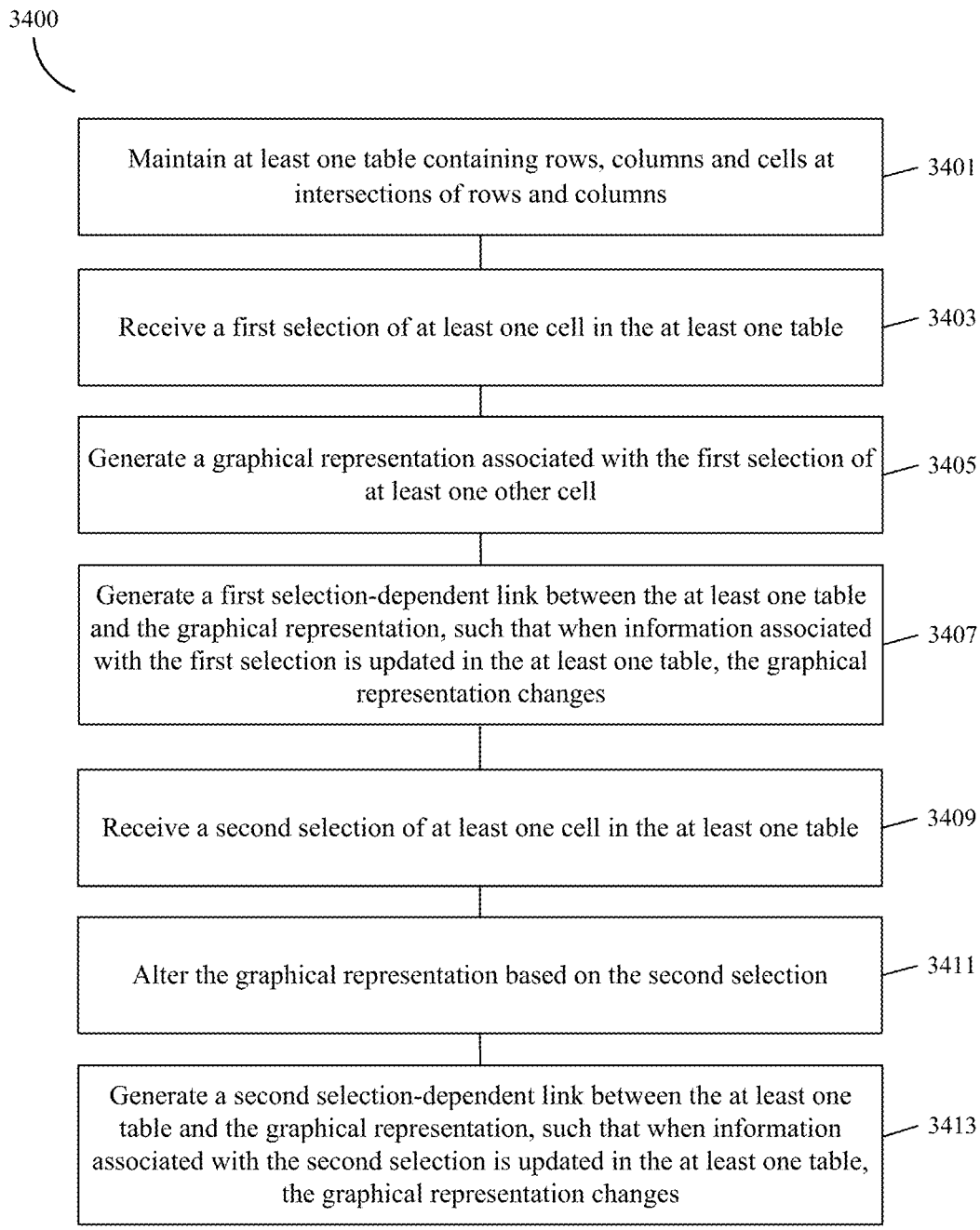
FIG. 34 is a block diagram of an example process for automatically filtering data in complex tables, consistent with some embodiments of the present disclosure.

FIG. 34 illustrates a block diagram of an example process 3400 for customizing chart generation based on table data selection, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 3400 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 19 to 33 by way of example. In some embodiments, some aspects of the process 3400 may be implemented as software (e.g., program codes or instructions) that are stored in a memory (e.g., the memory portion 122 in FIG. 1) or a non-transitory computer-readable medium. In some embodiments, some aspects of the process 3400 may be implemented as hardware (e.g., a specific-purpose circuit). In some embodiments, the process 3400 may be implemented as a combination of software and hardware.

FIG. 34 includes process blocks 3401 to 3413. At block 3401, a processing means (e.g., the processing circuitry 110 in FIG. 1) may maintain at least one table containing rows, columns and cells at intersections of rows and columns (e.g., table 2101 in FIG. 21 or table 2300 in FIG. 23).

At block 3403, the processing means may receive a first selection of at least one cell in the at least one table (e.g., selection of "Person 1" cell 2401 associated with "Person" column 2403 in FIG. 24).

At block 3405, the processing means may generate a graphical representation associated with the first selection of at least one cell (e.g., graphical representation 2601 in FIG. 26 following selection of "Stuck" cell 2501 associated with "Status" column 2503 in FIG. 25).

At block 3407, the processing means may generate a first selection-dependent link between the at least one table and the graphical representation, such that when information associated with the first selection is updated in the at least one table, the graphical representation changes (e.g., graphical representation 2701 in FIG. 27 changing as a result of a change in a task associated with Person 1). In some embodiments, the first selection-dependent link may be tied to a column in the at least one table (e.g., graphical representation 2801 in FIG. 28 showing information for persons other than Person 1).

At block 3409, the processing means may receive a second selection of at least one cell in the at least one table (e.g., selection of "Person 2" cell 2901a associated with "Person" column 2903 a in FIG. 29A).

At block 3411, the processing means may alter the graphical representation based on the second selection (e.g., graphical representation 3001a in FIG. 30A being altered to include indicators associated with Person 2).

At block 3413, the processing means may generate a second selection-dependent link between the at least one table and the graphical representation, such that when information associated with the second selection is updated in the at least one table, the graphical representation changes (e.g., graphical representation 3101 in FIG. 31 changing as a result of a change in a task associated with Person 2).

In some embodiments, the processing means may be configured to cancel the first selection in response to the second selection (e.g., deselecting "Person 1" cell as a result of selection of "Person 2" cell 3201 in FIG. 32).

In some embodiments, the processing means may be configured to receive a cancellation of the second selection, and following the cancellation receipt, revive the first selection (e.g., table 2900a in FIG. 29A reverting back to table 2500 in FIG. 25).

In some embodiments, the processing means may, upon revival of the first selection, to revert the graphical representation to a prior state (e.g., graphical representation 3001a in FIG. 30A reverting back to graphical representation 2601 in FIG. 26)

In some embodiments, the processing means may, in response to receiving a request, generate another graphical representation based on the first and second selection-dependent links between the at least one table and the graphical representation (e.g., battery graph 3301, line chart 3303, or bar chart 3305 in FIG. 33, which are different from graphical representation 3001a in FIG. 30A).

In some embodiments, the processing means may receive a cancellation of the second selection, and following the cancellation receipt, revive the first selection to regenerate both the graphical representation and the another graphical representation (e.g., a pie chart, i.e., the graphical representation, and a battery chart, i.e., the another graphical representation, displaying information associated only with a selection of a first person, i.e., the first selection).

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

displaying multiple headings including a first heading and a second heading;

receiving a first selection of a first cell associated with the first heading;

wherein the first cell includes a first category indicator;

receiving a second selection of a second cell associated with the first heading;

wherein the second cell includes a second category indicator;

receiving a third selection of a third cell associated with the second heading;

wherein the third cell includes a third category indicator;

generating a logical filter for the complex table by;

joining with an "or," the first selection and the second selection associated with the first heading, the first selection and the second selection constituting a first group;

joining with an "and," the third selection and the first group;

applying the logical filter to the complex table;

in response to application of the logical filter, causing a display of a filtered collection of items from the first group that contain the third category indicator;

regenerating the logical filter in response to an input to provide additional filter options;

calculating and displaying a number of times that the first category indicator appears under the first heading;

reducing the displayed number of times following receipt of the third selection;

applying the logical filter in real time to each selection;

causing the logical filter to be saved in memory for later application;

causing the logical filter to be saved in a repository for application to a summary view of the complex table;

generating a real time indicator of a number of received selections;

wherein causing a display of the filtered collection includes displaying metadata associated with at least one item of the collection;

maintaining at least one table containing rows, columns and cells at intersections of rows and columns;

receiving a first selection of at least one cell in the at least one table;

generating a graphical representation associated with the first selection of the at least one cell;

generating a first selection-dependent link between the at least one table and the graphical representation, such that when information associated with the first selection is updated in the at least one table, the graphical representation changes;

receiving a second selection of at least one cell in the at least one table;

altering the graphical representation based on the second selection;

generating a second selection-dependent link between the at least one table and the graphical representation, such that when information associated with the second selection is updated in the at least one table, the graphical representation changes;

wherein the graphical representation includes at least two visualizations and the at least one processor is further configured to receive an input and altering a presentation of at least one of the at least two visualizations in response to the input;

cancelling the first selection in response to the second selection;
receiving a cancellation of the second selection, and following the cancellation receipt, reviving the first selection;
upon revival of the first selection, reverting the graphical representation to a prior state;
wherein the first selection-dependent link is tied to a column in the at least one table;
in response to receiving a request, generating another graphical representation based on the first and second selection-dependent links between the at least one table and the graphical representation;
receiving a cancellation of the second selection, and following the cancellation receipt, revive the first selection to regenerate both the graphical representation and the another graphical representation.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for customizing chart generation based on table data selection, the system comprising:
at least one processor configured to:
maintain at least one table containing rows, columns, and cells at intersections of rows and columns, at least some of the cells being associated with at least one workflow management item;
receive a first selection of at least one cell in the at least one table;
receive a second selection of at least one cell in the at least one table;
generate a graphical representation including a first depiction and a second depiction, the first depiction being associated with the first selection and a first workflow management item, and the second depiction being associated with the second selection and a second workflow management item;

generate a first selection-dependent link between the at least one table and the graphical representation, such that when information associated with the first workflow management item is updated in the at least one table, the first depiction changes; and generate a second selection-dependent link between the at least one table and the graphical representation, such that when information associated with the second workflow management item is updated in the at least one table, the second depiction changes.

2. The system of claim 1, wherein the graphical representation includes at least two visualizations each associated with at least one widget-based filter and the at least one processor is further configured to receive an input and to alter a presentation of at least one of the at least two visualizations using the at least one widget-based filter in response to the input.

3. The system of claim 1, wherein the at least one processor is configured to cancel the first selection in response to the second selection.

4. The system of claim 1, wherein the at least one processor is further configured to receive a cancellation of the second selection, and following the cancellation receipt, revive the first selection.

5. The system of claim 4, wherein the at least one processor is configured, upon revival of the first selection, to revert the graphical representation to a prior state.

6. The system of claim 1, wherein the first selection-dependent link is tied to a column in the at least one table.

7. The system of claim 1, wherein the at least one processor is further configured to, in response to receiving a request, generate another graphical representation based on the first and second selection-dependent links between the at least one table and the graphical representation.

8. The system of claim 7, wherein the at least one processor is further configured to receive a cancellation of the second selection, and following the cancellation receipt, revive the first selection to regenerate both the graphical representation and the another graphical representation.

9. The system of claim 1, wherein the at least one processor is configured to:
receive an interaction with the first depiction; and
select the at least one cell in the at least one table of the first selection in response to the interaction.

10. The system of claim 1, wherein the first depiction and the second depiction are associated with a status of at least one workflow management item.

11. A non-transitory computer readable medium containing instructions that when executed by at least one processor, cause the at least one processor to perform operations for customizing chart generation based on table data selection, the operations comprising:
maintaining at least one table containing rows, columns, and cells at intersections of rows and columns, at least some of the cells being associated with at least one workflow management item;
receiving a first selection of at least one cell in the at least one table;
receiving a second selection of at least one cell in the at least one table;
generating a graphical representation including a first depiction and a second depiction, the first depiction being associated with the first selection and a first workflow management item, and the second depiction being associated with the second selection and a second workflow management item;

generating a first selection-dependent link between the at least one table and the graphical representation, such that when information associated with the first workflow management item is updated in the at least one table, the first depiction changes; and generating a second selection-dependent link between the at least one table and the graphical representation, such that when information associated with the second workflow management item is updated in the at least one table, the second depiction changes.

12. The non-transitory computer readable medium of claim 11, wherein the operations are configured to cancel the first selection in response to the second selection.

13. The non-transitory computer readable medium of claim 11, wherein the operations further comprise receiving a cancellation of the second selection, and following the cancellation receipt, reviving the first selection.

14. The non-transitory computer readable medium of claim 13, wherein, the operations further comprise, upon revival of the first selection, reverting the graphical representation to a prior state.

15. The non-transitory computer readable medium of claim 11, wherein the first selection-dependent link is tied to a column in the at least one table.

16. The non-transitory computer readable medium of claim 11, wherein the operations further comprise, in response to receiving a request, generating another graphical representation based on the first and second selection-dependent links between the at least one table and the graphical representation.

17. The non-transitory computer readable medium of claim 16, wherein the operations further comprise receiving a cancellation of the second selection and reviving the first selection to regenerate both the graphical representation and the another graphical representation following the cancellation receipt.

18. A method for customizing chart generation based on table data selection, the method comprising:
maintaining at least one table containing rows, columns, and cells at intersections of rows and columns, at least some of the cells being associated with at least one workflow management item;
receiving a first selection of at least one cell in the at least one table;
receiving a second selection of the at least one cell in the at least one table;
generating a graphical representation including a first depiction and a second depiction, the first depiction being associated with the first selection and a first workflow management item, and the second depiction being associated with the second selection and a second workflow management item;
generating a first selection-dependent link between the at least one table and the graphical representation, such that when information associated with the first workflow management item is updated in the at least one table, the first depiction changes; and
generating a second selection-dependent link between the at least one table and the graphical representation, such that when information associated with the second workflow management item selection is updated in the at least one table, the second depiction changes.

19. The method of claim 18, wherein the second selection cancels the first selection.

20. The method of claim 18, further comprising receiving a cancellation of the second selection, and following the cancellation receipt, reviving the first selection.

21. The method of claim 20, wherein, upon revival of the first selection, the graphical representation reverts to a prior state.

22. The method of claim 18, wherein the first selection-dependent link is tied to a column in the at least one table.

23. The method of claim 18, further comprising, in response to receiving a request, generating another graphical representation based on the first and second selection-dependent links between the at least one table and the graphical representation.

24. The method of claim 18, further comprising:
receive an interaction with the first depiction; and
select the at least one cell in the at least one table of the first selection in response to the interaction.

25. The method of claim 18, wherein the first depiction and the second depiction are associated with a status of at least one workflow management item.

26. A system for customizing chart generation based on table data selection, the system comprising:
at least one processor configured to:
maintain at least one table containing rows, columns and cells at intersections of rows and columns;
receive a first selection of at least one cell in the at least one table;
receive a second selection of at least one cell in the at least one table;
generate a graphical representation associated with the first selection and the second selection;
generate a first selection-dependent link between the at least one table and the graphical representation, such that when information associated with the first selection is updated in the at least one table, the graphical representation changes;
generate a second selection-dependent link between the at least one table and the graphical representation, such that when information associated with the second selection is updated in the at least one table, the graphical representation changes;
in response to receiving a request, generate another graphical representation based on the first and second selection-dependent links between the at least one table and the graphical representation; and
receive a cancellation of the second selection, and following the cancellation receipt, revive the first selection to regenerate both the graphical representation and the another graphical representation.

27. A non-transitory computer readable medium containing instructions that when executed by at least one processor, cause the at least one processor to perform operations for customizing chart generation based on table data selection, the operations comprising:
maintaining at least one table containing rows, columns and cells at intersections of rows and columns;
receiving a first selection of at least one cell in the at least one table;
receiving a second selection of at least one cell in the at least one table;
generating a graphical representation associated with the first selection and the second selection;
generating a first selection-dependent link between the at least one table and the graphical representation, such that when information associated with the first selection is updated in the at least one table, the graphical representation changes;
generating a second selection-dependent link between the at least one table and the graphical representation, such that when information associated with the second selection is updated in the at least one table, the graphical representation changes;
in response to receiving a request, generating another graphical representation based on the first and second selection-dependent links between the at least one table and the graphical representation; and
receiving a cancellation of the second selection and reviving the first selection to regenerate both the graphical representation and the another graphical representation following the cancellation receipt.

\* \* \* \* \*